US010370964B2

(12) United States Patent
Yang et al.

(10) Patent No.: US 10,370,964 B2
(45) Date of Patent: Aug. 6, 2019

(54) ESTIMATION OF FORMATION PROPERTIES BASED ON BOREHOLE FLUID AND DRILLING LOGS

(71) Applicant: Baker Hughes Incorporated, Houston, TX (US)

(72) Inventors: Wenxia Yang, Delft (NL); Xiaomei Zhang, Utrecht (NL)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 492 days.

(21) Appl. No.: 15/068,033

(22) Filed: Mar. 11, 2016

(65) Prior Publication Data
US 2017/0260855 A1  Sep. 14, 2017

(51) Int. Cl.
E21B 49/00  (2006.01)
G01V 99/00  (2009.01)

(52) U.S. Cl.
CPC .......... E21B 49/005 (2013.01); G01V 99/005 (2013.01)

(58) Field of Classification Search
CPC combination set(s) only.
See application file for complete search history.

(56) References Cited

U.S. PATENT DOCUMENTS

| 8,701,012 | B1 | 4/2014 | Selman et al. | |
| 2007/0294034 | A1* | 12/2007 | Bratton | E21B 41/00 702/6 |
| 2010/0089120 | A1* | 4/2010 | Hanson | E21B 49/005 73/19.02 |
| 2011/0139464 | A1 | 6/2011 | Henderson et al. | |
| 2014/0090891 | A1 | 4/2014 | Pitcher et al. | |
| 2014/0379265 | A1 | 12/2014 | Beda et al. | |
| 2016/0047219 | A1* | 2/2016 | Jeffryes | E21B 44/00 700/275 |
| 2016/0305231 | A1* | 10/2016 | Majidi | E21B 44/04 |
| 2017/0044896 | A1* | 2/2017 | Salminen | E21B 44/00 |

FOREIGN PATENT DOCUMENTS

WO  2013155125 A1  10/2013

OTHER PUBLICATIONS

Ablard, et al.; "The Expanding Role of Mud Logging"; Oil Review; Schlumberger, Spring 2012; 18 pages.

(Continued)

Primary Examiner — Mamadou L Diallo
(74) Attorney, Agent, or Firm — Cantor Colburn LLP

(57) ABSTRACT

A method of estimating one or more properties of an earth formation includes disposing a carrier in a borehole in an earth formation as part of an energy industry operation, receiving borehole fluid from the borehole, estimating at least one property of the borehole fluid associated with one or more intervals along the borehole, and generating a mud log that indicates values of the at least one property at the one or more intervals, the at least one property including at least one of gas content and cuttings content. The method also includes estimating, by a processor, one or more properties of the formation based on the mud log, the one or more properties selected from at least one of lithology, permeability, total organic carbon and brittleness, and controlling one or more operational parameters of the energy industry operation based on the one or more properties of the formation.

17 Claims, 21 Drawing Sheets

(56) References Cited

OTHER PUBLICATIONS

Altindag, R.; "The Evaluation of Rock Brittleness Concept on Rotary Blast Hole Drills";The Journal of South African Institute of Mining and Metallurgt; Jan./Feb. 2002; 6 pages.
Dozier, et al.; "Refracturing Work"; Oil Review; Schlumberger; Autumn 2003; 16 pages.
Eren, Tuna; "Real-Time Optimization of Drilling Parameters During Drilling Operations"; a PH.D Theisis; Feb. 2010; 165 pages.
Nguyen, Tan; "Chapter 5: Drilling Bits"; Drilling Engineering; 2012; 18 pages.
Pemper, et al.; "A New Pulsed Neutron Sonde for Derivation of Formation Lithology and Mineralogy";SPE 102770; 2006; Society of Petroleum Engineers; 13 pages.
Perez, et al.; "Calibration of Brittleness to Elastic Rock Properties via Mineralogy Logs in Unconventional Reservoirs"; Search and Discovery Article #41237; 2013; AAPG; 32 pages.
Schlumberger; "Fundamentals of Formation Testing"; 2006; Sclumberger, Sugar Land Texas; 25 pages.
Solano, et al.; A modified approach to predict pore pressure using the D exponent method: An example from the carbonera formation, Columbia; CT & F-Ciencia, tecnologia y Futuro—vol. 3 No. 3 Dic 2007; 9 pages.
International Search Report and the Written Opinion of the International Searching Authority; PCT/US2017/021348; Korean Intellectual Property Office; dated Jun. 1, 2017; 14 pages.

\* cited by examiner

ESTIMATION OF FORMATION PROPERTIES BASED ON BOREHOLE FLUID AND DRILLING LOGS

BACKGROUND

Geologic formations below the surface of the earth may contain reservoirs of oil and gas, which are retrieved by drilling one or more boreholes into the subsurface of the earth. The boreholes are also used to measure various properties of the boreholes and the surrounding subsurface formations.

Unconventional formations are increasing employed for gas and oil exploration and production. Unconventional formations are typically low permeability formations that often require hydraulic fracturing or other techniques to stimulation hydrocarbon production. One challenge in exploiting and evaluating unconventional formations is the relative lack of logging data as compared to conventional formations.

SUMMARY

An embodiment of a method of estimating one or more properties of an earth formation includes disposing a carrier in a borehole in an earth formation as part of an energy industry operation, receiving borehole fluid from the borehole, the borehole fluid including at least injection fluid injected into the borehole, estimating at least one property of the borehole fluid associated with one or more intervals along the borehole, and generating a mud log that indicates values of the at least one property at the one or more intervals, the at least one property including at least one of gas content and cuttings content. The method also includes estimating, by a processor, one or more properties of the formation based on the mud log, the one or more properties selected from at least one of lithology, permeability, total organic carbon and brittleness, and controlling one or more operational parameters of the energy industry operation based on the one or more properties of the formation.

An embodiment of a system for estimating one or more properties of an earth formation includes a carrier configured to be disposed in a borehole in an earth formation as part of an energy industry operation, and an analysis unit configured to receive borehole fluid from the borehole, the borehole fluid including at least injection fluid injected into the borehole. The analysis unit is configured to estimate at least one property of the borehole fluid associated with one or more intervals along the borehole and generate a mud log that indicates values of the at least one property at the one or more intervals, the at least one property including at least one of gas content and cuttings content. The system also includes a processor configured to perform estimating one or more properties of the formation based on the mud log, the one or more properties selected from at least one of lithology, permeability, total organic carbon and brittleness, and controlling one or more operational parameters of the energy industry operation based on the one or more properties of the formation.

BRIEF DESCRIPTION OF THE DRAWINGS

The following descriptions should not be considered limiting in any way. With reference to the accompanying drawings, like elements are numbered alike.

DETAILED DESCRIPTION

Systems and methods are provided for estimating properties and characteristics of earth formations based on formation fluid measurements such as mud logs and/or drilling parameter measurements. Mud log data includes data generated by measuring borehole fluid constituents including hydrocarbon gases and cuttings returned from a borehole. In one embodiment, mud log data is used to estimate lithology and/or mineralogy characteristics of a formation.

An embodiment of a method of estimating formation properties includes calculating a gas indicator log and/or permeability indicator log from gas log data, which can be used as an indicator of permeability, pore pressure and other formation properties. Another embodiment of a method includes deriving total organic carbon data from gas log data.

In one embodiment, drilling parameter measurements from, e.g., drilling parameter logs, are analyzed to estimate formation properties such as brittleness. Formation property data derived from mud logs and drilling parameter logs may be analyzed to estimate "sweet spots", or formation regions that are most amenable to stimulation, to facilitate hydraulic fracturing or other stimulation operations.

Embodiments described herein are applicable to conventional formations and unconventional formations such as shale formations, oil sands, tight gas sands, fractured formation and shale formations. For example, embodiments are applicable to deviated and/or horizontal borehole sections in unconventional formations such as shale layers.

Embodiments described herein address a number of challenges or difficulties that arise in current exploration, evaluation and production operations. For example, data regarding formation measurements can be limited, especially in unconventional assets, leading to a potentially large uncertainty. Horizontal wells in unconventional formations typically only have gamma ray logs available and thus lack the ability to generate valuable information regarding the formation. Embodiments described herein utilize mud log and/or drilling parameter data to derive information about a formation that may be unavailable due to a lack of other types of logging data.

Mud log data is generally available and often is the only available logging data other than gamma ray data in unconventional formations. However, mud log data is generally used only by well-site geologists or engineers as a support tool for drilling engineering, and is often ignored for formation evaluation due to several reasons, such as uncertainty in related depth, large uncertainty in porosity/permeability estimation, and the lack of well-defined indicators to use in formation evaluation. Embodiments described herein employ mud log data, either alone or in combination with other measurements or logging data, to derive information about formations that is of significant value in formation evaluation, stimulation and production.

Figure 1:
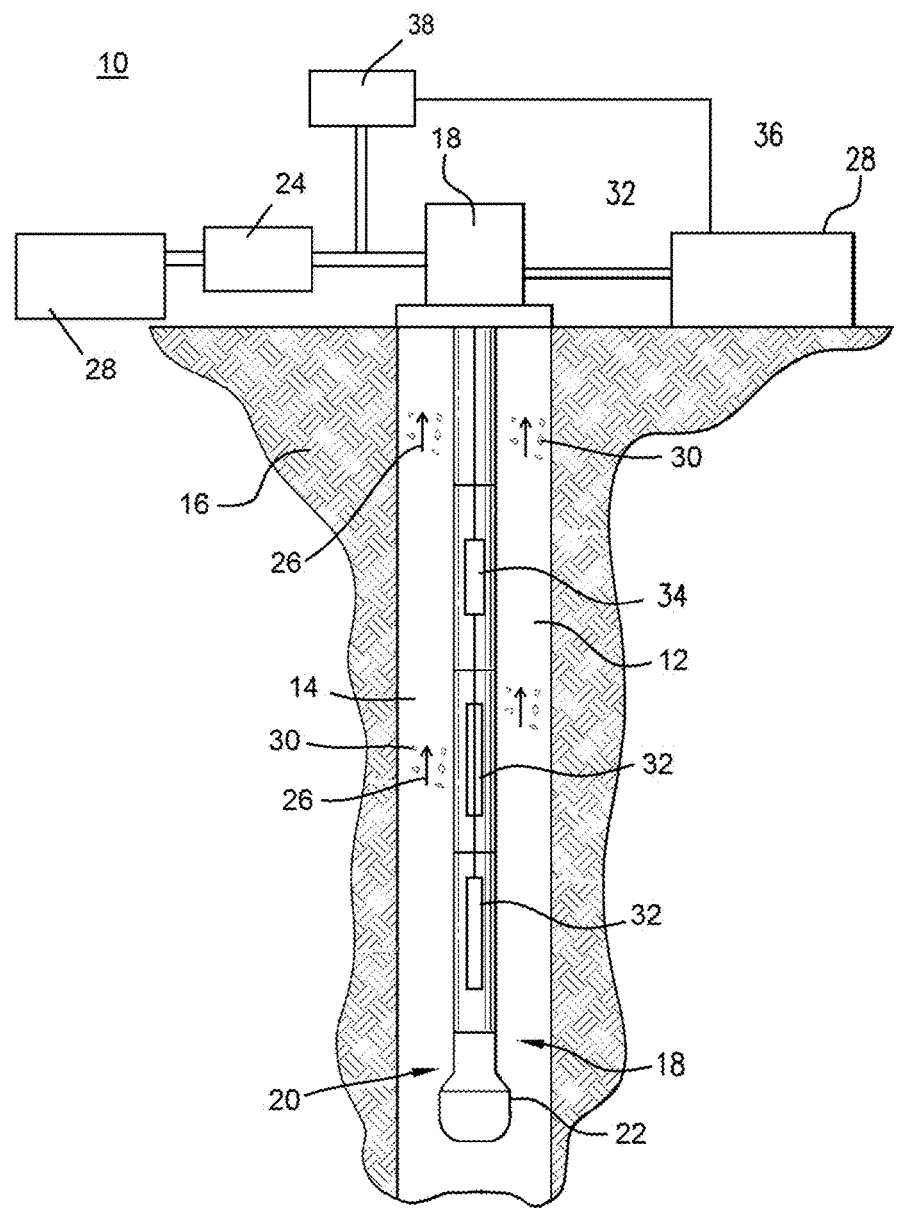
FIG. 1 depicts an exemplary embodiment of a drilling, formation evaluation and/or production system.

Referring to FIG. 1, an embodiment of a well drilling, logging and/or production system 10 includes a borehole string 12 that is shown disposed in a well or borehole 14 that penetrates at least one earth formation 16 during a drilling or other downhole operation. As described herein, "borehole" or "wellbore" refers to a single hole that makes up all or part of a drilled well. It is noted that the borehole 14 may include a vertical, deviated and/or horizontal, and may follow any suitable or desired path. As described herein, "formations" refer to the various features and materials that may be encountered in a subsurface environment and surround the borehole.

A surface structure or surface equipment 18 includes or is connected to various components such as a wellhead, derrick and/or rotary table for supporting the borehole string, rotating the borehole string and lowering string sections or other downhole components. In one embodiment, the borehole string 12 is a drillstring including one or more drill pipe sections that extend downward into the borehole 14, and is connected to a drilling assembly 20 that includes a drill bit 22. The surface equipment 18 also includes pumps, fluid sources and other components to circulate drilling fluid through the drilling assembly 20 and the borehole 14. Although the drillstring and the drill bit is shown in FIG. 1 as being rotated by a surface rotary device, the drill bit may be rotated by a downhole motor such as a mud motor.

For example, a pumping device 24 is located at the surface to circulate drilling mud 26 from a mud pit of other fluid source 28 into the borehole 14. Drilling mud 26 is pumped through a conduit such an interior bore of the borehole string 12 and exits the borehole string 12 at the drill bit 22. The drilling mud 26 then travels upward from the drill bit 22 through an annulus of the borehole 14 and returns to the surface. The returning borehole fluid includes drilling mud 26 and may include formation fluids that enter into the borehole 14 during the drilling process and/or rock cuttings 30 produced by the drill bit 22 during drilling.

In one embodiment, the system 10 includes any number of downhole tools 32 for various processes including formation drilling, geosteering, and formation evaluation (FE) for measuring versus depth and/or time one or more physical quantities in or around a borehole. The tool 32 may be included in or embodied as a bottomhole assembly (BHA) 34, drill string component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carrier examples include casing pipes, wirelines, wireline sondes, slickline sondes, drop shots, downhole subs, bottom-hole assemblies, and drill strings.

The tool 32, the drilling assembly 20 and/or other portions of the borehole string 12 includes sensor devices configured to measure various parameters of the formation and/or borehole. In one embodiment, the tool 32 is configured as a downhole gamma ray measurement tool, such as a logging-while-drilling (LWD) gamma ray logging tool.

Although the system 10 is described in this embodiment as including a drilling assembly, it is not so limited. For example, the system 10 may be configured as a measurement system that includes the tool 32 incorporated in a wireline system or a stimulation (e.g., hydraulic fracturing) system.

In one embodiment, the tool 32, drilling assembly 20 and/or sensor devices include and/or are configured to communicate with a processor to receive, measure and/or estimate directional and other characteristics of the downhole components, borehole and/or the formation. For example, the tool 32 is equipped with transmission equipment to communicate with a processor such as a downhole processor 34 or a surface processing unit 36. Such transmission equipment may take any desired form, and different transmission media and connections may be used. Examples of connections include wired, fiber optic, acoustic, wireless connections and mud pulse telemetry.

The processor may be configured to receive data from the tool 32 and/or process the data to generate formation parameter information. In one embodiment, the surface processing unit 36 is configured as a surface drilling control unit which controls various drilling parameters such as rotary speed, weight-on-bit, drilling fluid flow parameters and others.

In one embodiment, the surface equipment includes one or more components configured as a borehole fluid measurement or logging device or system. For example, the surface processing unit 36 includes or is connected to a borehole fluid analysis unit or system 38 that performs measurements of borehole fluid and cuttings. For example, borehole fluids are separated from the rock cuttings 30 and sent to a gas chromatography test device to determine the amount or volume of hydrocarbon and non-hydrocarbon gases present in the borehole fluid. The system 38 also includes or is connected to a cuttings analysis system that prepares cuttings (e.g., by sampling, washing, drying and grinding) and measures relative amounts of minerals and other formation materials in the cuttings. The analysis system 38 can be run periodically or continuously during drilling.

Performing measurements of borehole fluid (e.g., fluid returned to the surface) is referred to herein as "mud logging." It is noted that "mud logging" is not intended to denote measurements of a particular type of fluid or material, but may be applicable to performing measurements and deriving information from any material found in borehole fluid. Mud logging may include lithology data in the form of, e.g., cuttings logs, and may also include data identifying gas constituents in the form of, e.g., gas logs.

Mud log lithology refers to the analysis of mud or borehole fluid retrieved from the borehole includes and identifying different lithology and/or mineral types based on cuttings and other samples/bits of the formation. For example, a mass or amount of each lithology and/or mineral type is analyzed to determine weight fractions of various materials. It is noted that descriptions of lithology herein may also be applicable to mineralogy.

Mud log lithology can provide significant information about rock types and formation characteristics. Because the mud log is based on physical samples, it provides direct, positive identification of lithology and hydrocarbon content. Mud log lithology is typically similar to LWD/wireline lithology in both data format and application. One advantage of mud logs, however, is that they are available for potentially every well, whereas relatively few wells have LWD/wireline lithology logs. The use of mud log lithology can provide good control over a large area with acceptable accuracy.

Gas logs may be generated by continuously or periodically recording gas in returned borehole fluid by gas detectors at the surface, and can identify amounts and types of gases in the return fluid. Gas logs can be indicators of pore pressure, and allow for identification of potentially dangerous conditions, such as blowouts. Depth of gas logs is consistent with lithology/cutting depth. Mud log gas can be classified according to the operation that releases the gas into the borehole (Drilled gas, background gas, connection gas, flow check gas, trip gas, swab gas, etc.)

The fluid analysis system 38, the surface processing unit 36 and/or other components of the system 10 are configured to perform measurements and evaluations of a formation using mud log data taken from one or more boreholes, such as the borehole 14. In one embodiment, the mud log data is taken from a borehole having a deviated and/or horizontal section running through a conventional or unconventional formation. For example, the fluid analysis system 38 generates a mud log that includes cuttings measurement and fluid measurement data performed from borehole fluid retrieved from the borehole during drilling. Alternatively, the mud log is generated by the surface processing unit 36 or another suitable processor.

Figure 2:
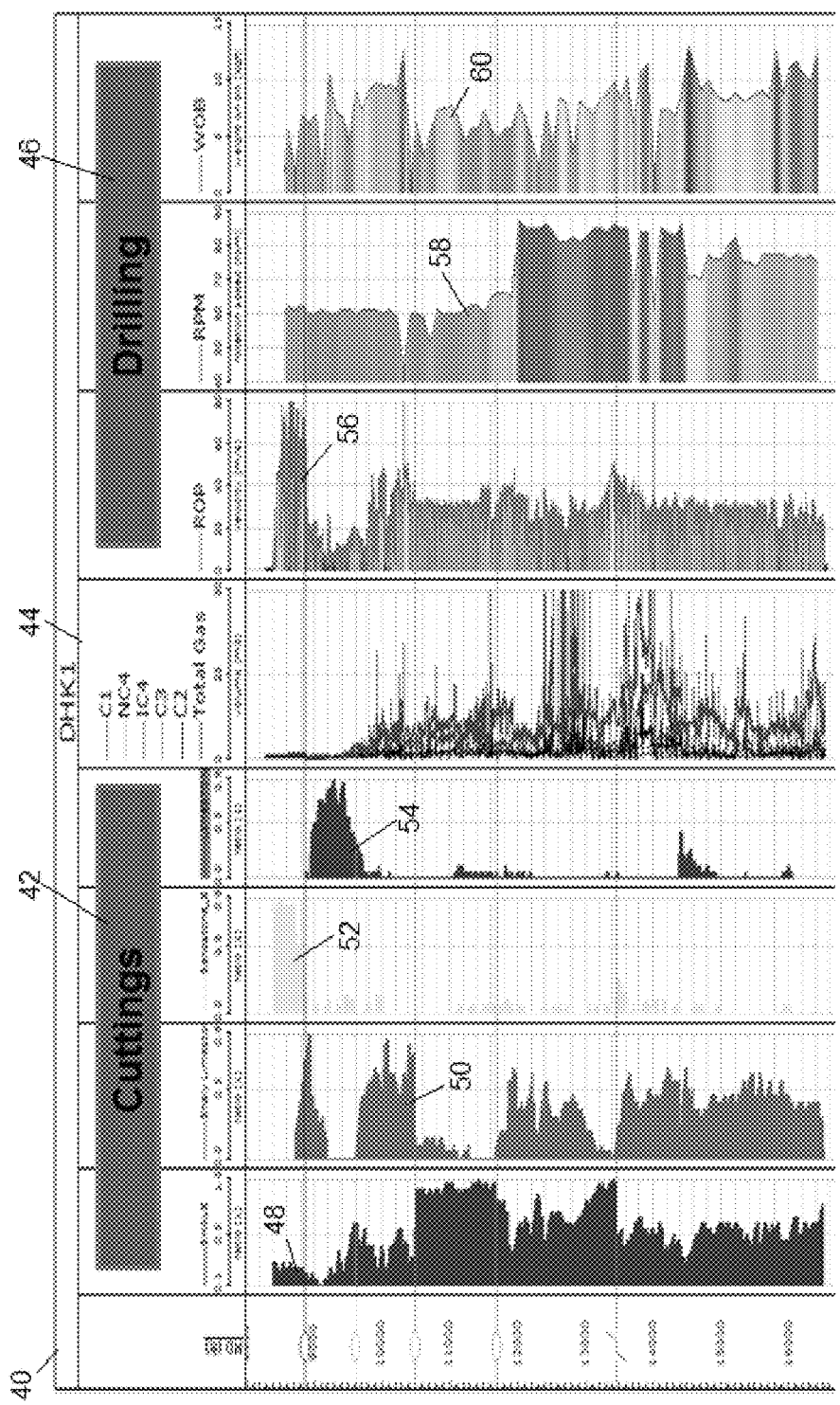
FIG. 2 depicts an example of a mud log and drilling parameter log.

FIG. 2 illustrates an example of logging data 40, which includes cuttings logs 42 and a gas log 44 (collectively referred to as a mud log). The logging data may also include drilling parameter logs 46. The cuttings logs 42 may include individual constituent logs indicating an amount or proportion of constituent materials of the cutting. In this example, the cuttings logs include a shale log 48 indicating a ratio of shale to the total material. Logs 50, 52 and 54 indicate a ratio of shaly limestone, sandstone and limestone, respectively. A variety of formation information may be derived according to embodiments described herein, including lithology (rock type), permeability, TOC and brittleness. The gas log 44 shows the volume of different gases as a function of depth.

The gas log 44 in this example tracks total gas and constituent gases including hydrocarbon gases C1, C2, C3, iC4 (butane), nC4 (isobutene). It is noted that the constituent gases that can be tracked are not limited to those presented in this example.

In one embodiment, the surface processing unit 36 or another processor generates or receives drilling parameter data in the form of, e.g., drilling parameter logs. Drilling parameter logs are generated by recording drilling parameters such as rotational rate, weight on bit and rate of penetration. Drilling parameter logs are often generated as part of a mud log or in combination with a mud log.

Drilling parameter logging includes measuring real time drilling parameters such as rate of penetration (ROP) (also referred to as drill rate), rotational rate (typically in revolutions per minute or RPM), weight on bit (WOB), mud weight, mud viscosity and others. This information is usually obtained by attaching monitoring devices to a drilling rig's equipment with a few exceptions such as the mud weight and mud viscosity which are measured by an operator such as a derrick hand or mud engineer. Unlike mud log data, drilling parameter data does not have a lag time. In the example of FIG. 2, the logging data 40 includes an ROP log 56, a rotational rate log 58 and a WOB log 60.

A processor such as the surface processing unit 36 is configured to derive information about a formation based on fluid measurement data from mud logs and/or based on drilling parameter measurements. Such information includes lithology data derived from cuttings logs, and permeability data and total organic carbon data from gas logs.

Figure 3:
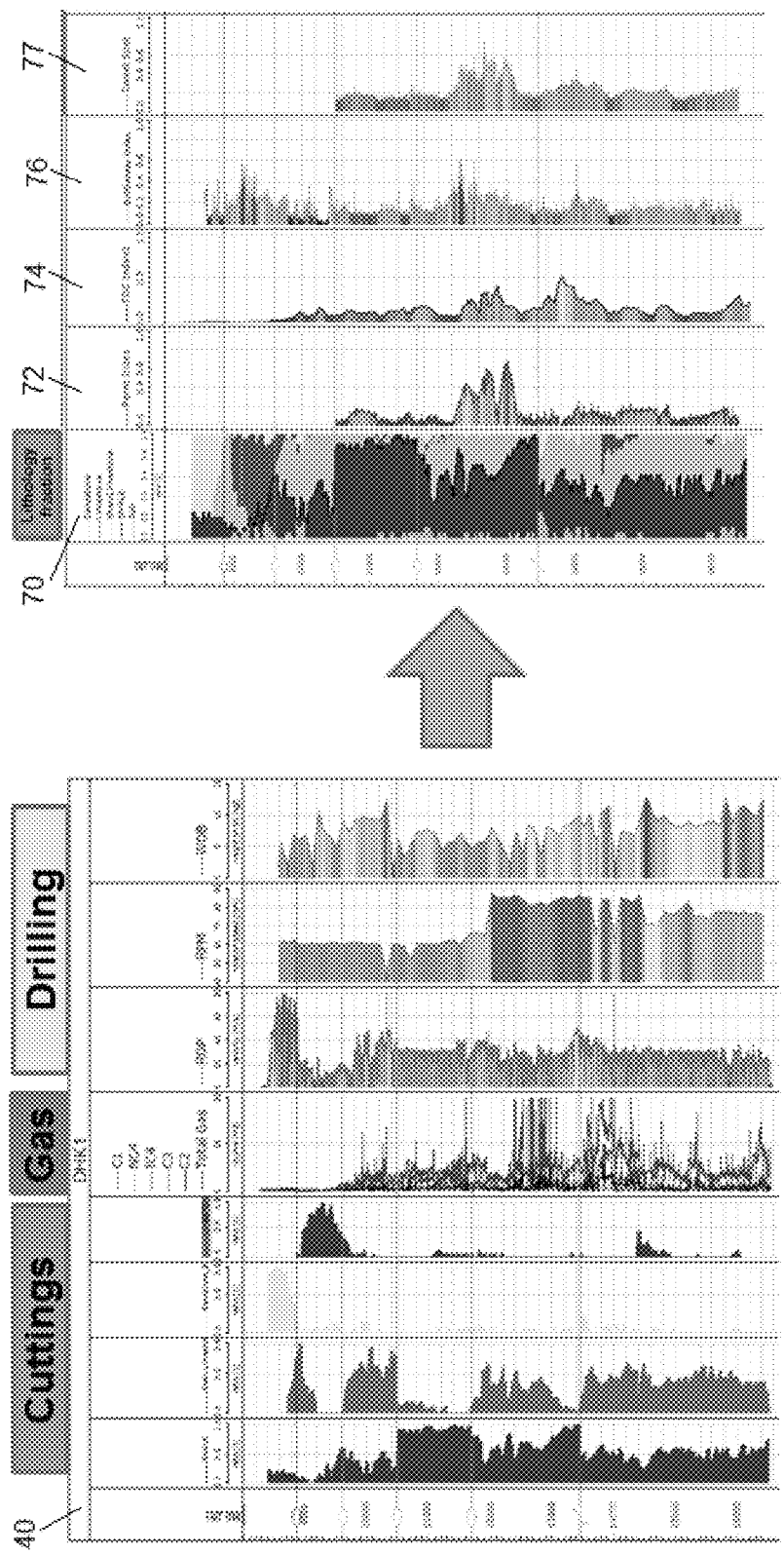
FIG. 3 depicts an example of formation property data derived from the mud log and/or the drilling parameter log of FIG. 2.

FIG. 3 shows an example of formation information that can be derived from mud logs and/or drilling parameter logs. In this example, the formation information is derived from the logging data 40 discussed above. The logging data 40 is used to generate a lithology log 70 indicating rock type, a gas indicator log 72 indicative of a formation property such as permeability, a total organic carbon (TOC) indicator log 74, a brittleness indicator log 76, and a sweet spot indicator log 77.

Figure 4:
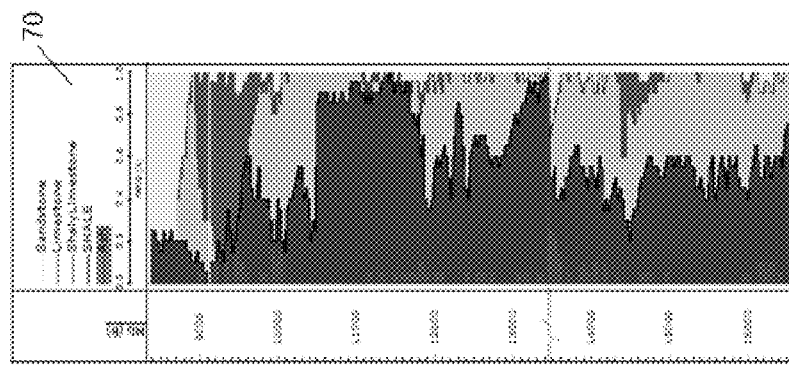
FIG. 4 depicts examples of lithology/mineralogy data that can be derived from mud log data.

In one embodiment, mud log data is used to estimate relative proportions of minerals and other materials to generate a lithology fraction model. Such a model is important especially in unconventional formation evaluation. FIG. 4 shows an example of mineralogy data for different shale formations, which can be derived from mud logs. The output is presented in weight fractions of each mineral component which sum to 100% (or 1.0 as shown in FIG. 4). Lithology/mineralogy can be used to, e.g., determine TOC, reduce uncertainty in porosity calculations, identify lithofacies (e.g., shale facies) and assist with planning of stimulation and completion design.

A gas log acquired by mud logging and may be used to estimate various formation properties. The gas log can be analyzed to determine, e.g., porosity and pressure conditions. In one embodiment, the gas log is analyzed to identify and estimate connection gas and derive formation properties based on a comparison between total gas and connection gas.

Total gas (TG), also referred to as background gas, is the total volume of gas detected from a mud log at a given depth. An increase in total gas can be attributed to three main causes: increased drilling rate, entrance into a gas-rich formation, and gas release out of solution by a decrease in pressure due to negative differential pressure (which is indicative of increased porosity and pore pressure).

Connection gas (CG) is caused by a connection imbalance that occurs due to gas influx into drilling fluid or borehole fluid when a connection is made between two downhole components. For example, gas may enter the borehole when fluid circulation is stopped (e.g., by stopping drilling fluid pumps) to connect a drill pipe.

Figure 5:
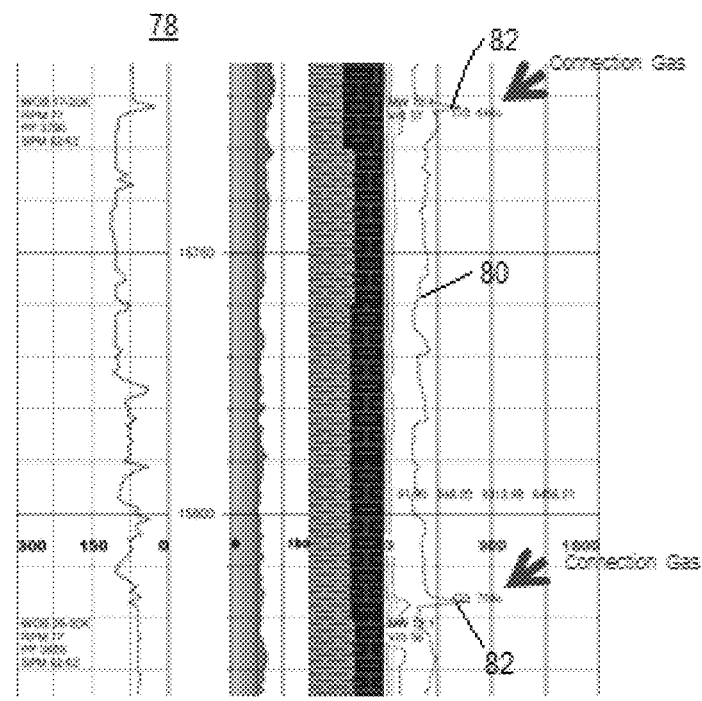
FIG. 5 depicts an example of gas log peaks identified to estimate a volume or amount of connection gas from a gas log.

Connection gas is typically identified by a peak above background gas levels in a mud log, and typically occurs one lag interval following the connection. The magnitude of connection gas is an indicator of the permeability of the formation that is underbalanced. FIG. 5 shows an example of a portion of a gas log 78 and illustrates how connection gas is identified and quantified. The gas log includes a total gas curve 80 and exhibits peaks 82 due to connection gas. The amount or volume of connection gas is estimated based on a difference between the magnitude of each peak 82 and the magnitude of the total gas near the peak.

Various kinds of information may be derived based on inspection of background and/or connection gas levels, and/or based on a comparison between connection gas and background gas levels. The magnitude of connection gas may be used as an indicator of permeability. Where background and connection gas are both increasing, drilling is approaching imbalance or negative differential pressure. A transition zone into higher pore pressure may be indicated by stable background gas but gradually increasing connection gas.

In one embodiment, the processor is configured to generate or derive a formation property indicator log based on measurements or total gas and/or connection gas, referred to herein as a gas indicator log. The gas indicator log can be used as an indicator of porosity, permeability, pore pressure and gas concentration. In one embodiment, the gas indicator log is used as an indicator of permeability or permeability changes, and is also referred to as a permeability indicator log. The gas indicator log is derived from mud log total gas and connection gas data, and may be calibrated by formation evaluation results from other borehole or other sections of the same borehole that have additional log data in the same or similar formation region. The gas indicator log can be used in individual well evaluations and/or as a petrophysical property. The gas indicator log may further be used as a secondary property in porosity, permeability, pore pressure and/or effective stress analysis. In addition, the gas indicator log can be used for borehole and operation planning, for example in the application of hydraulic fracture design and the selection of suitable formation region (e.g., shale region) candidates for re-fracturing. Gas indicator logs have significant value in promoting knowledge about the heterogeneity of unconventional formations such as shale reservoirs and can facilitate fracture design, well placement and re-fracture candidate selection.

Figure 6:
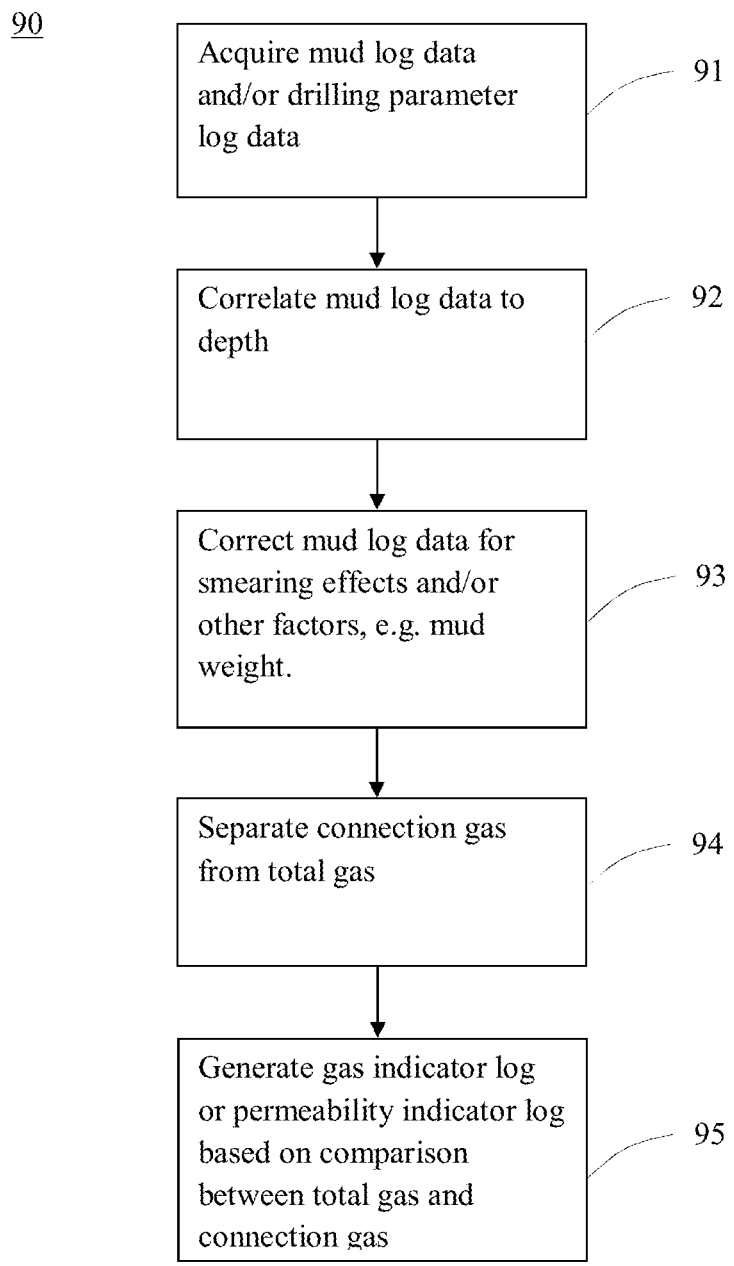
FIG. 6 is a flow diagram depicting an embodiment of a method of calculating a gas indicator log based on mud log data.

FIG. 6 illustrates a method 90 of performing a downhole operation, acquiring mud log data and/or estimating formation properties based on the mud log data. The method 90 is used in conjunction with the system 10 and/or the surface processing unit 36, although the method 90 may be utilized in conjunction with any suitable combination of sensing devices and processors. The method 90 may be performed entirely by the processor, in combination with other processors, and/or in combination with a human operator or user. The method 90 includes one or more stages 91-95. In one embodiment, the method 90 includes the execution of all of stages 91-95 in the order described. However, certain stages may be omitted, stages may be added, or the order of the stages changed.

Figure 7:
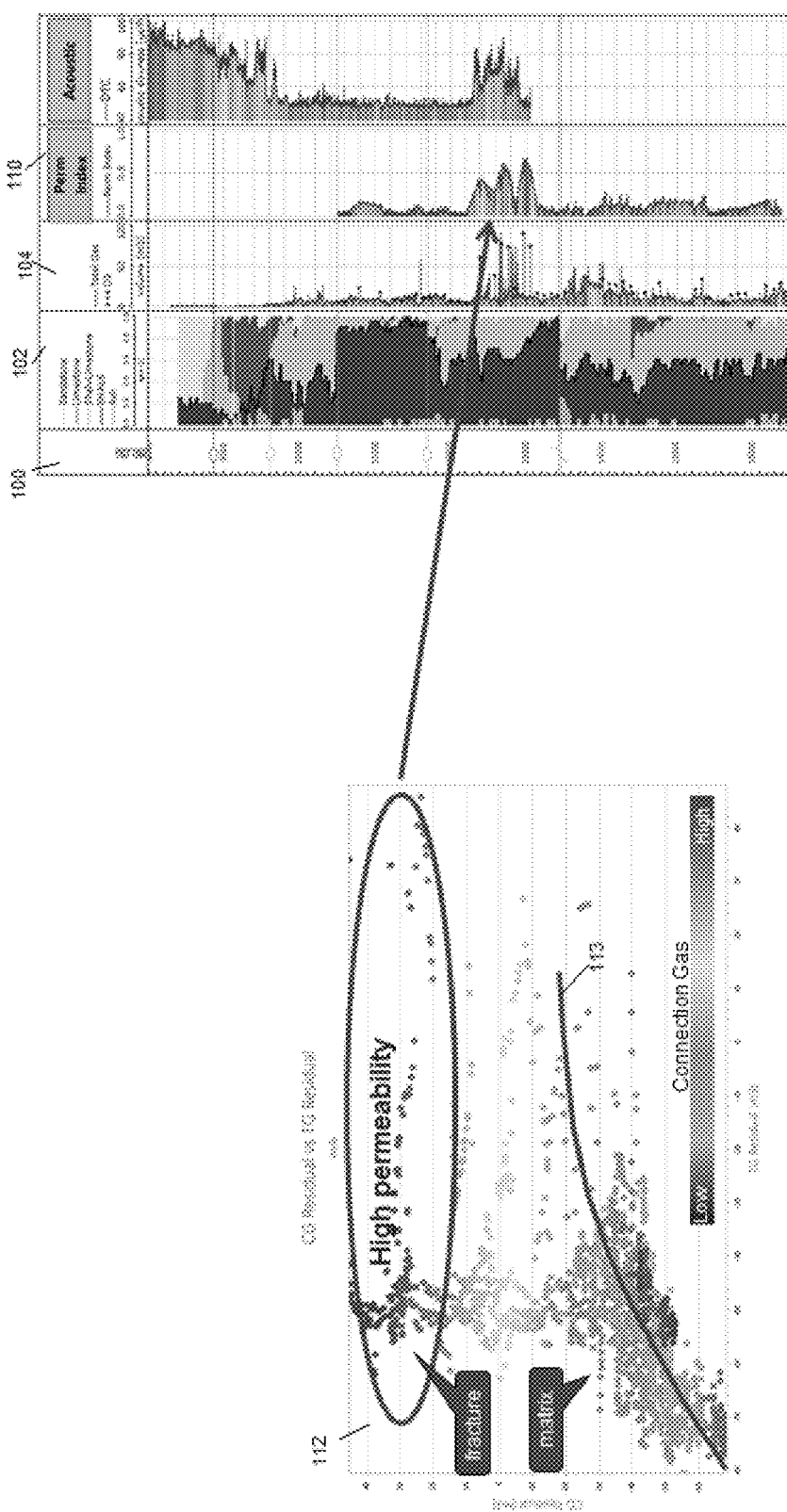
FIG. 7 depicts aspects of the method of FIG. 6 and depicts an example of a gas indicator log.

In the first stage 91, well data including mud log data and/or drilling parameter data is acquired. For example, a drill string, logging string and/or production string is disposed within a borehole in a formation and a downhole operation is performed. During the operation, drilling fluid (e.g., drilling mud) is circulated into the borehole, and borehole fluid is returned to the surface. The mud is analyzed to measure lithology and fluid content, and a mud log is generated. An example of a mud log 100 is shown in FIG. 7, which includes a lithology log 102 and a gas log 104.

In the second stage 92, in one embodiment, the mud log is calibrated to correlate mud log data points to depth. For example, if mud analysis is performed at the surface, depth calculation is performed based on lag time, i.e., the amount of time it takes for drilling fluid to return to the surface. Depth information from drilling log data is taken to estimate the depth of the drill bit relative to time, and mud log data generated at a given time is correlated to depth based on the log data and lag time. Tracing materials such as calcium carbide may be added to injected fluid to facilitate estimation of the lag time. In addition or alternatively, depth calibration can be calibrated with a Gamma ray log or other measurement log taken at the borehole and/or another borehole (e.g., an offset well) in the same or a similar formation.

In the third stage 93, in one embodiment, the mud log is corrected for factors such as the smearing effects of the cuttings. Traditionally in vertical boreholes and borehole sections, a sample of cuttings is acquired over a relatively large depth interval, so the grain size and clay content can vary significantly, thus the results are often considered as having a significant uncertainty. In horizontal boreholes and borehole sections, there is generally less smearing in cuttings, as the formation grain size and clay content do not vary as much.

Additional steps can be taken to correct for other factors that may influence the accuracy of gas measurements. Such factors include mud weight and operation activities (e.g., drilling gas, trip gas, swab gas, etc.).

In the fourth stage 94, connection gas (CG) is separated from total gas (TG) indicated by the mud log. In one embodiment, increases in gas detection volumes at locations of connections in a drill string when adding drill pipe are measured and correlated with connection gas, e.g., by comparing the gas volume at connections with the gas volume at adjacent depth intervals.

For example, the gas log 104 of FIG. 7 is analyzed to identify peaks in a total gas curve 106 associated with connection gas. Connection gas peaks 108 are identified and marked by a point marker in FIG. 7. Each peak 108 is compared to adjacent or nearby sections of the total gas curve to estimate the volume of connection gas at a depth interval at which the peak occurs.

In the fifth stage 95, formation properties are derived from the gas data. In one embodiment, a trend line and/or residual is calculated based on total gas values and is compared to a trend line and/or residual calculated based on connection gas values to derive gas indicator values which may be presented as a gas indicator log. The difference between connection gas and total gas can be used to estimate properties such as permeability, porosity and/or pore pressure. The difference may also be used to inform drilling parameters such as rate of penetration.

In one embodiment, once connection gas and total gas are separated, a baseline (trend line) for both total gas and connection gas is calculated. Based on the trend line, a residual is calculated for both the connection gas trend line and the total gas trend line. The trend lines and/or residuals may be normalized.

An example of a gas indicator log 110 (also referred to as a permeability indicator log or permeability index log) that is used as an indicator of permeability is shown in FIG. 7. In this example, a normalized total gas (TG) residual and a connection gas (CG) residual are correlated using a cross plot 112, and a regression is performed to generate a function shown as a curve 113. Positive correlations are associated with a higher gas indicator value, and negative correlations are associated with a lower gas indicator value. A higher gas indicator value indicates higher porosity/ permeability, higher pore pressure (lower effective stress) or higher gas concentration.

In one embodiment, the gas indicator log is calibrated by linking the different characteristics of the gas indicator log to other borehole sections and/or different boreholes. The gas indicator log may be calibrated to logs including formation measurement data such as porosity, permeability, pore pressure or brittleness, and TOC. In one embodiment, the gas indicator log is generated in a vertical or deviated section of a borehole for which other logging information is available and calibrated to the other logging information. This calibration may then be applied to gas indicator values in a horizontal section of the borehole.

In horizontal borehole sections, the depth associated with gas indictor values does not vary much relative to vertical sections, thus the gas indicator mainly reflects the heterogeneity of the formation (e.g., a shale reservoir) along the horizontal section. This provides a solid base to use the gas indicator log in horizontal boreholes which may not have other logging data (beyond potentially gamma ray data).

In one embodiment, the processor is configured to estimate total organic carbon (TOC) based on gas logs included in mud log data. TOC data is derived from total gas estimated via a gas log, and may be used to generate a TOC indicator log. The TOC indicator log may be may be calibrated by formation evaluation results from other borehole or other sections of the same borehole that have additional log data in the same or similar formation region. A TOC log can be used, for example, in individual well evaluation or populated into a three-dimensional grid or model as a petrophysical property.

In organic-rich rock TOC is related to gas content and total porosity, and is calculated as described herein based on gas responses in a gas log. In one embodiment, the gas responses include a frequency of gas peaks in the gas log, i.e., a number of gas peaks occurring in a given depth or borehole interval. One type of gas response is a pulse type response in which detected gas peaks occur along a log interval or intervals at a relatively high frequency. Pulse type responses are related to permeability and fracturing. Another type of response is a diffuse type response in which peaks occur at a relatively low frequency. Diffuse type responses are related to gas richness and porosity.

Figure 8:
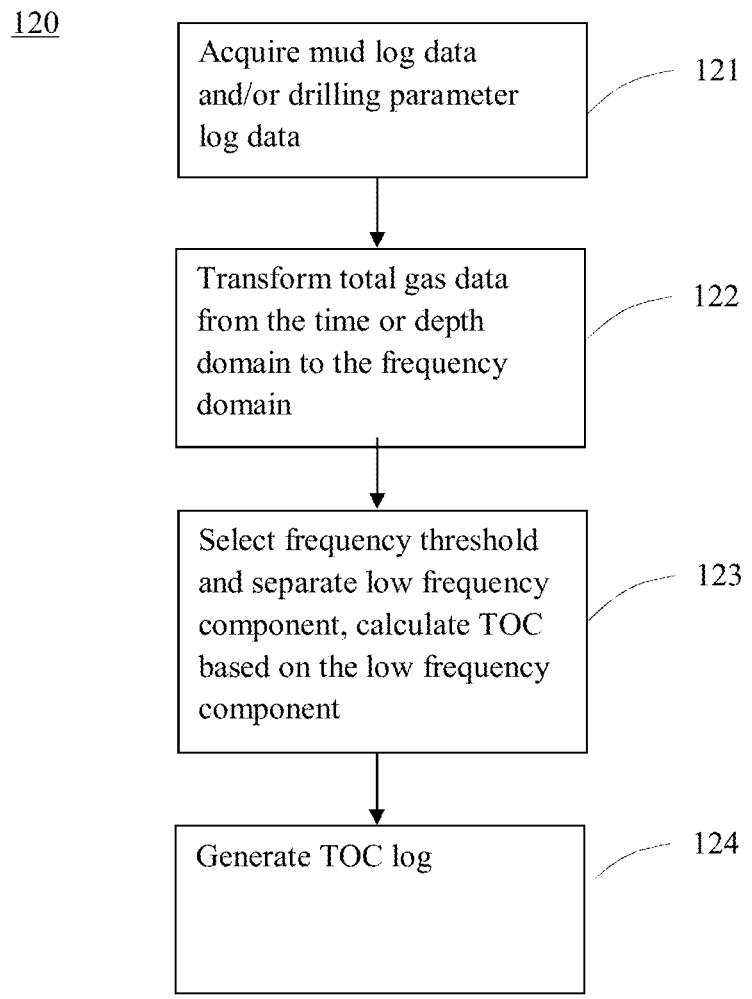
FIG. 8 is a flow diagram depicting an embodiment of a method of calculating a total organic carbon indicator log based on mud log data.

FIG. 8 illustrates a method 120 of performing a downhole operation, acquiring mud log data and/or performing measurements including TOC. The method 120 is used in conjunction with the system 10 and/or the surface processing unit 36, although the method 120 may be utilized in conjunction with any suitable combination of sensing devices and processors. The method 120 may be performed entirely by the processor, in combination with other processors, and/or in combination with a human operator or user. The method 120 includes one or more stages 121-124. In one embodiment, the method 90 includes the execution of all of stages 121-124 in the order described. However, certain stages may be omitted, stages may be added, or the order of the stages changed.

In the first stage 121, mud log data is acquired during a downhole operation. The mud log data may be acquired and processed as described above in relation to the method 90.

In the second stage 122, total gas data or curve is transformed from the depth or time domain to the frequency domain. Transformation may be performed using a Fourier transform of any suitable type, such as a fast Fourier Transform (FFT).

In the third stage 123, a frequency value or threshold is selected based on, e.g., other logs. The low frequency component (i.e., the component of the frequency domain data associated with frequencies below the threshold) is separated from higher frequency components to identify regions of high gas richness, which can be correlated to TOC. In one embodiment, a suitable filter is applied to separate the high frequency components.

The TOC is calculated based on the volume or magnitude of total gas associated with the low frequency component. In one embodiment, the TOC of a deviated or horizontal section is determined by calibrating the low frequency component values to TOC measured in a vertical section of the borehole and/or in another borehole in the same or a similar formation. The volume or magnitude value may be used as or correlated with a TOC indicator value, which can be normalized to a selected value range.

For example, the values calculated by separating the low frequency components are linked to available TOC data, such as TOC data from core samples and/or from LWD logs. This provides a solid base to use the TOC log in horizontal boreholes which may not have other logging data (beyond potentially gamma ray data).

Figure 9:
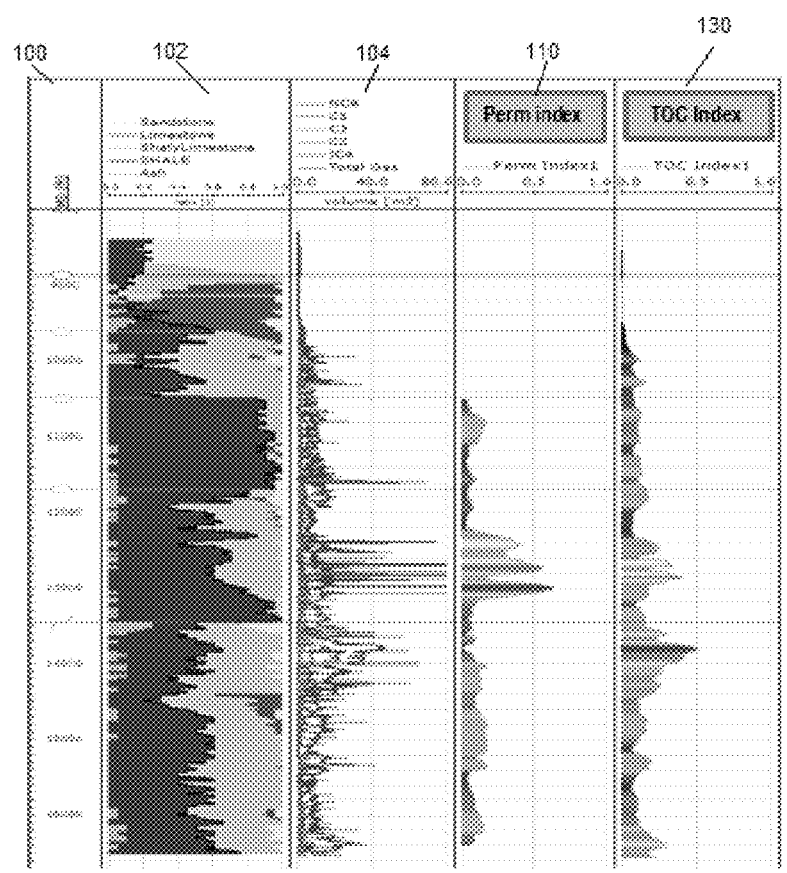
FIG. 9 depicts an example of a total organic carbon indicator log generated using the method of FIG. 8.

In the fourth stage 124, a TOC log is generated, an example of which is shown in FIG. 9. In this example, a TOC indicator log 130 (also referred to as a TOC index log) is generated. As shown, the TOC indicator log can be displayed or presented in a mud log along with the gas indicator. The method 120 mat include a number of additional processing steps, such as correction of TOC indicator values to kerogen type and the level of organic maturity (LOM).

In one embodiment, the processor is configured to estimate pressure characteristics such as pore pressure, which can be used to facilitate drilling operations. Drilling parameters are measured during drilling, and are often presented or displayed along with mud log data. Such drilling parameters include, e.g., drilling rate or rate of penetration (ROP), weight on bit (WOB), rotational rate (RPM), and mud weight (EMW).

Different conditions and formation properties have different effects on drilling parameters. Factors which influence ROP are many, including lithology, bit type, bit wear, rotation rate (RPM) and weight on bit (WOB), bit torque, as well as pore pressure and compaction. As rocks compact they become harder and denser, and the ROP of a drill bit decreases. More porous rock will drill faster than less porous rock. Increasing pore pressure (if it is associated with increasing porosity) produces an increase in ROP. Penetration rate slows as differential pressure increases, and vice versa.

One type of characteristic that can be derived is the drilling exponent (also referred to as the d-exponent). The d-exponent is calculated by extrapolating some drilling parameters to estimate a pressure gradient for pore pressure estimation or prediction during drilling. The d-exponent is a dimensionless parameter that, in one embodiment, is calculated based on the following equation:

$$R/N = a(W/D)^d, \qquad (1)$$

where "R" is the drilling rate or ROP in feet/meter, "N" is the rotational rate or RPM, "W" is the WOB in pounds, "D" is the diameter of a drill bit in inches, "a" is a lithological constant, and "d" is the d-exponent.

Figure 10:
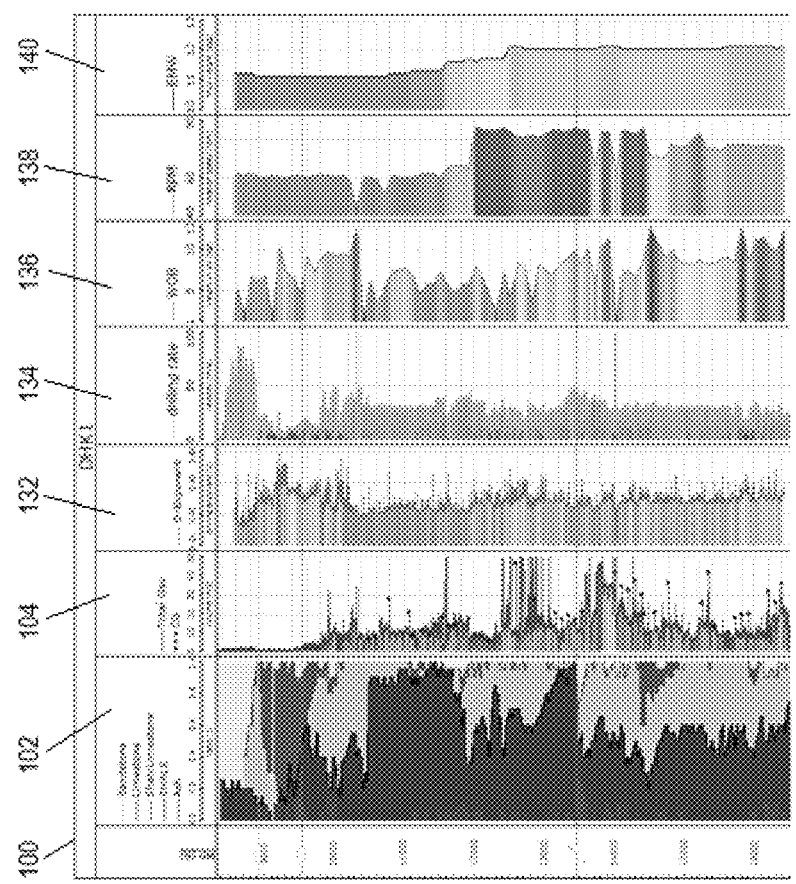
FIG. 10 depicts an example of a mud log, drilling log and a d-exponent log.

The d-exponent may be corrected or calibrated with respect to mud density measurements to derive a corrected d-exponent (also referred to as the dc-exponent). The d-exponent and the dc-exponent can be viewed as the ROP normalized to WOB, RPM, EMW and bit diameter. An example of a D-exponent log 132 is shown in FIG. 10, which is presented with or as part of the mud log 100. In this example, the mud log is also presented with drilling parameter logs including a drilling rate (ROP) log 134, a WOB log 136, a RPM log 138 and a mud weight (EMW) log 140.

The d-exponent is effective in vertical to moderate deviated wells, but may not be accurate in highly deviated and/or horizontal boreholes. In addition, the d- or dc-exponent data is often used to predict overpressure events; however such events are rarely seen in shale oil and gas reservoirs.

In one embodiment, the processor is configured to estimate formation parameters related to drilling parameter measurements that can be used to facilitate drilling control and planning. Drilling parameter data and/or mud log data s, such as parameters acquired by drilling parameter logs (which may be acquired with mud logs), are used to estimate the brittleness of a formation. In one embodiment, brittleness measurements are quantified as a brittleness indicator (BI), which may be presented with or as part of a mud log.

Derivation of the brittleness indicator is based on drilling parameters including ROP, rotational rate and WOB, and is calculated using an empirical exponent "a". One advantage of the brittleness indicator described herein is that it can be used to account for the relatively small variations in rock type and pressure change around horizontal wells. The brittleness indicator thus provides a better indication of brittleness changes caused by the heterogeneities in a shale layer or other formation region along a horizontal well than the d-exponent or dc-exponent. The brittleness indicator may be utilized in conjunction with horizontal, deviated and/or vertical boreholes or borehole sections. In addition, the brittleness estimation and brittleness indicator described herein may be used as a Brittleness Index (BI), which is a widely used parameter for the quantification of rock brittleness.

Brittleness is a measurement of stored energy before failure, and is a function of parameters and properties such as rock strength, lithology, texture, effective stress, temperature, fluid type, diagenesis and TOC.

Brittleness as described herein is calculated based on relationships between ROP and RPM during drilling. During drilling, ROP usually increases linearly with low RPM. At higher values of RPM, the response of ROP to increases in RPM diminishes due to, e.g., poor hole cleaning. No significant ROP is obtained until a threshold bit weight is applied, after which ROP increases rapidly with increasing values of WOB. For a moderate value of bit weight, a linear relationship between ROP and RPM is often observed. However, at higher values of bit weight, subsequent increases in WOB cause only slight improvements in ROP. In some cases, a decrease in ROP is observed at extremely high value of WOB, which is often referred to as bit floundering.

Calculation of the brittleness indicator as described herein is based on the recognition that almost all drilling activities result in the linear relationship, and that the change rates of ROP vs. RPM and ROP vs. WOB are different in different formation materials. The brittleness indicator may this be calculated from drilling parameters independent of other formation measurement data, such as LWD data, wireline data, gas logs and lithology.

In one embodiment, the brittleness indicator is calculated based on the following equation:

$$R/N = BI(R/W)^a, \qquad (2)$$

where "R" is the rate of penetration (ROP), "N" is the rotational rate (RPM), "W" is the weight on bit (WOB), and "BI" is the brittleness indicator. The exponent "a", referred to herein as the a-exponent, is an empirical exponent, related to lithology and rock strength. This equation is based on a number of assumptions. One assumption is that the rate of change of "R/N" and the rate of change of "R/W" are different in brittle rock and ductile rock. Another assumption is that rock type is substantially stable around a horizontal section and bit size is constant.

Figure 11:
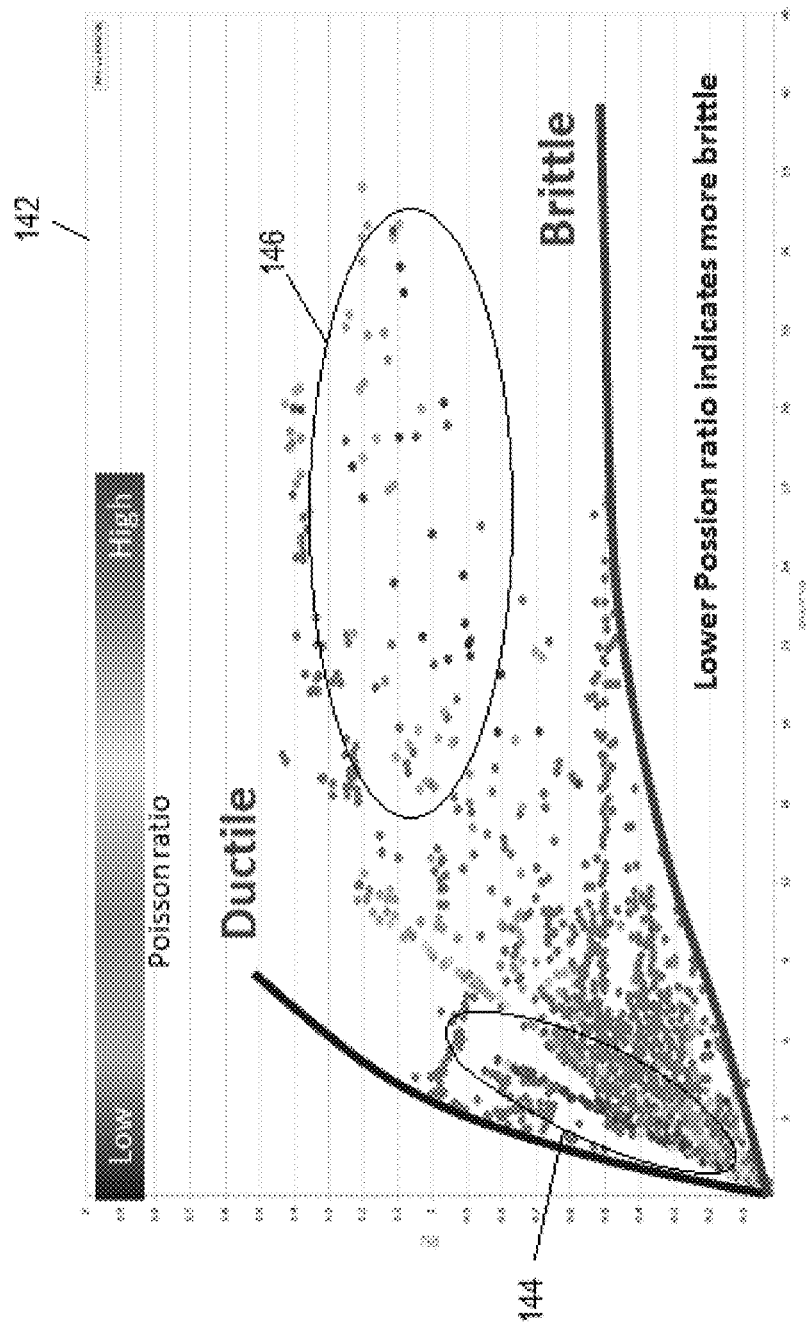
FIG. 11 depicts a cross plot of drilling parameter data generated according to aspects of a method of calculating brittleness properties of a formation.
Figure 12:
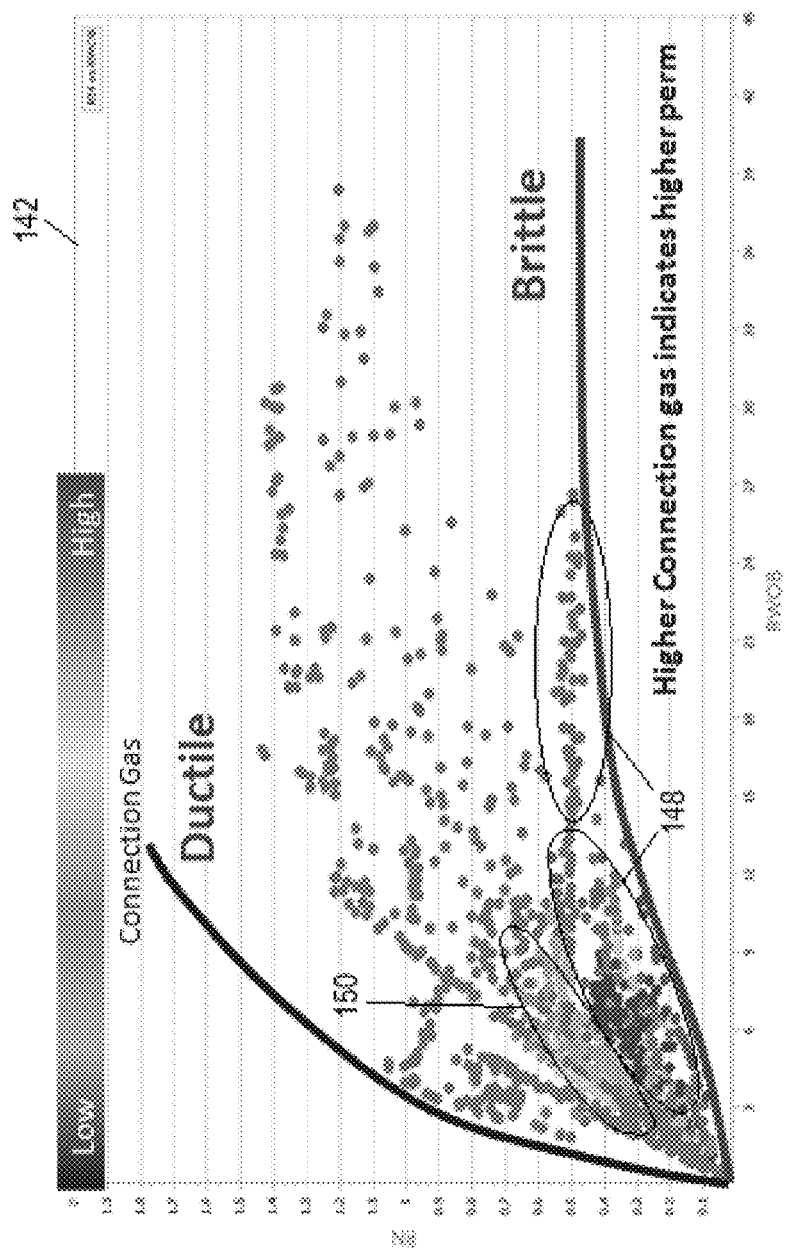
FIG. 12 depicts the cross plot of FIG. 11 including connection gas data.

FIGS. 11 and 12 show some observations that inform calculation of the brittleness indicator. FIGS. 11 and 12 depict a cross plot 142 including data points showing the relationship between R/N and R/W. In FIG. 11, the data points are color-coded according to the Poisson ratio of rock at depths corresponding to each data point, where a lower Poisson ratio indicates more brittle rock. In the example of FIG. 11, area 144 is populated by data points having high Poisson ratios and area 146 is populated by data points having low Poisson ratios.

In FIG. 12, the data points are color coded by the volume of connection gas at the depth associated with each data point, where higher connection gas volumes indicate higher permeability. In the example of FIG. 12, areas 148 are populated by data points having high connection gas volumes and area 150 is populated by data points having low connection gas volumes.

Figure 13:
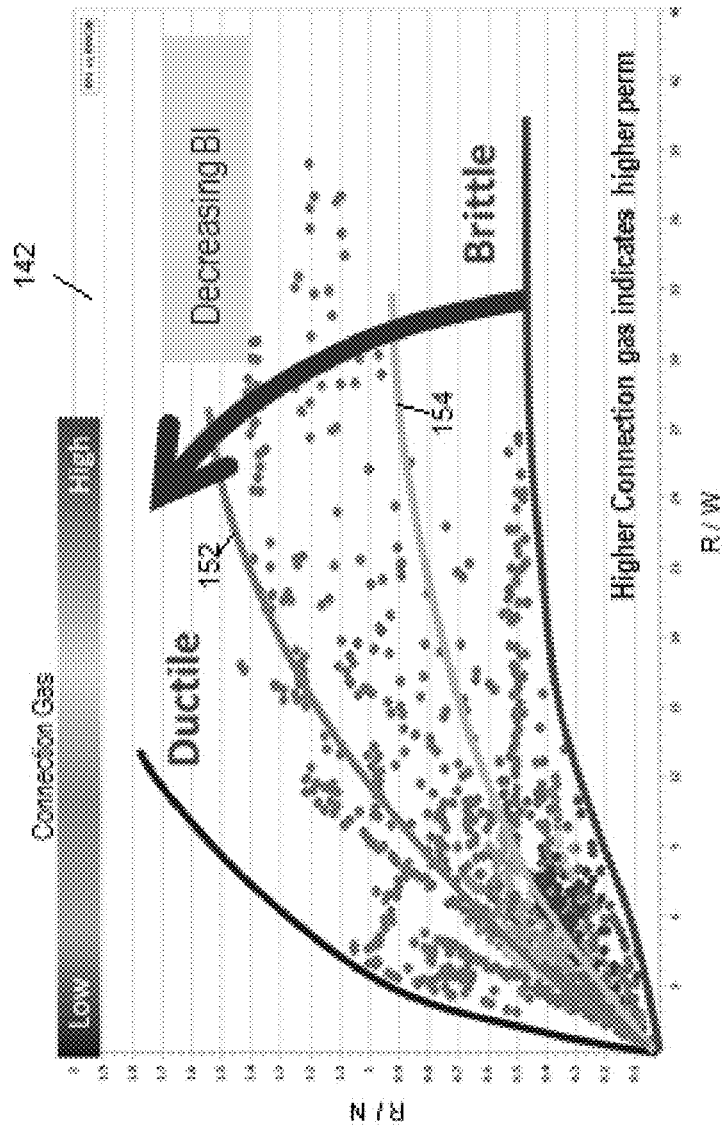
FIG. 13 depicts the cross plot of FIG. 11 and illustrates aspects of an a-exponent calculated as part of a method of calculating brittleness properties of a formation.

A method of estimating the BI based on mud log data is described with reference to FIGS. 13-17. The method includes estimating a value or range of values of the a-exponent based on measured drilling parameters. As shown in FIG. 13, the value of the a-exponent is related to brittleness, where higher values of the a-exponent correspond to less brittle (more ductile) formation materials.

Figure 14:
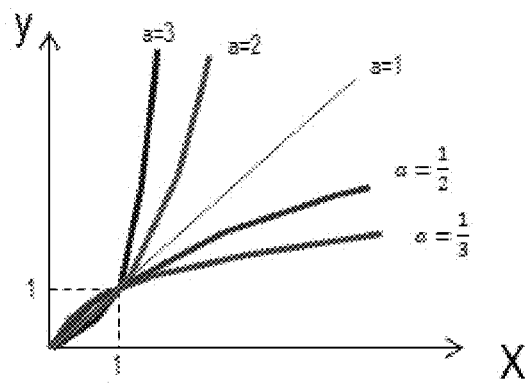
FIG. 14 illustrates a relationship between a-exponent values and a curve derived from drilling parameter data.
Figure 15:
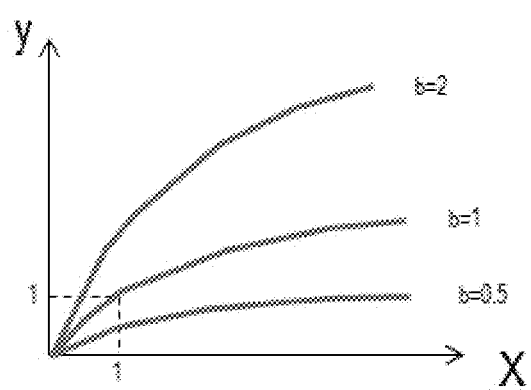
FIG. 15 illustrates a relationship between a constant and a curve derived from drilling parameter data.
Figure 16:
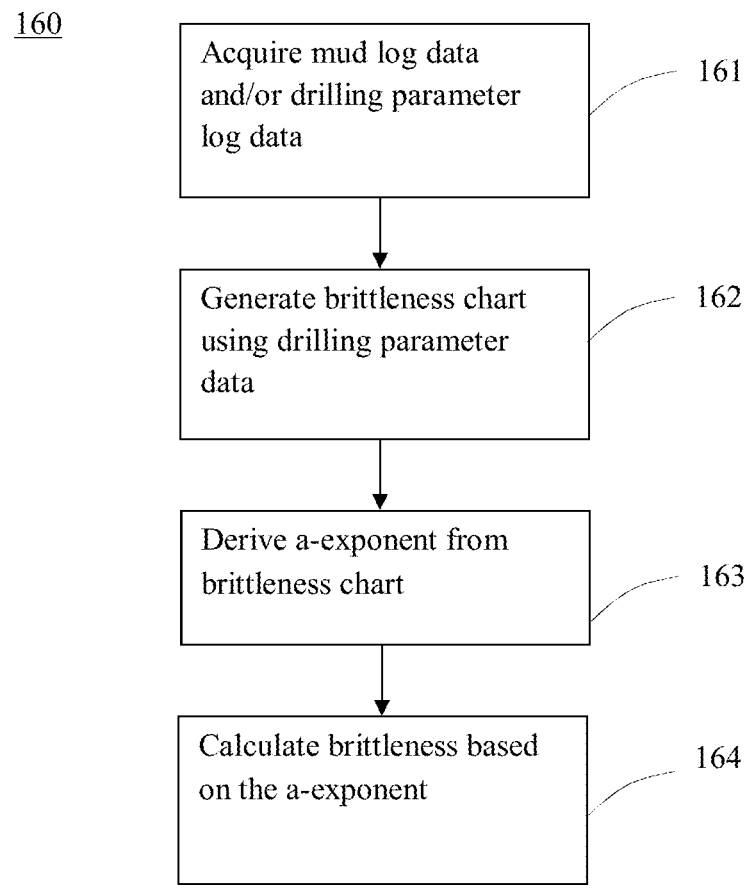
FIG. 16 is a flow diagram depicting an embodiment of a method of calculating brittleness properties of a formation.

FIGS. 14 and 15 show features or characteristics of the a-exponent. As shown in FIG. 15, for a function of $y=x^a$, the a-exponent controls the trend line shape. As shown in FIG. 16, for a fixed a-exponent, the value "b" defines the slope.

FIG. 13 shows trend lines calculated for data points in the cross plot 142. A trend line 152 is associated with data points having low connection gas, and a trend line 154 is associated with data points having high connection gas. The a-exponent in equation (2) controls the trend line shape, and the value of BI controls the trend line slope. In the example of FIG. 13, it is evident that the a-exponent is less than one. As demonstrated in FIGS. 13-15, a trend line of R/N to R/W can inform the value of the a-exponent.

FIG. 16 illustrates a method 160 of performing a downhole operation, acquiring mud log data and/or performing measurements including brittleness. The method 160 is used in conjunction with the system 10 and/or the surface processing unit 36, although the method 160 may be utilized in conjunction with any suitable combination of sensing devices and processors. The method 160 may be performed entirely by the processor, in combination with other processors, and/or in combination with a human operator or user. The method 160 includes one or more stages 161-164. In one embodiment, the method 90 includes the execution of all of stages 161-164 in the order described. However, certain stages may be omitted, stages may be added, or the order of the stages changed.

In the first stage 161, well data including mud log data and/or drilling parameter data is acquired. For example, during a drilling operation, various drilling parameters are measured and a drilling parameter log is acquired, which may be acquired along with a mud log. Examples of drilling parameters include ROP, WOB, rotary speed N (RPM) and mud weight.

In the second stage 162, an empirical brittleness chart or other graphical data representation is generated and populated with drilling data. An example of a brittleness chart in the form of the cross plot 142 is shown in FIGS. 11-13. A chart may be generated for any number of borehole regions or formation regions.

Figure 17:
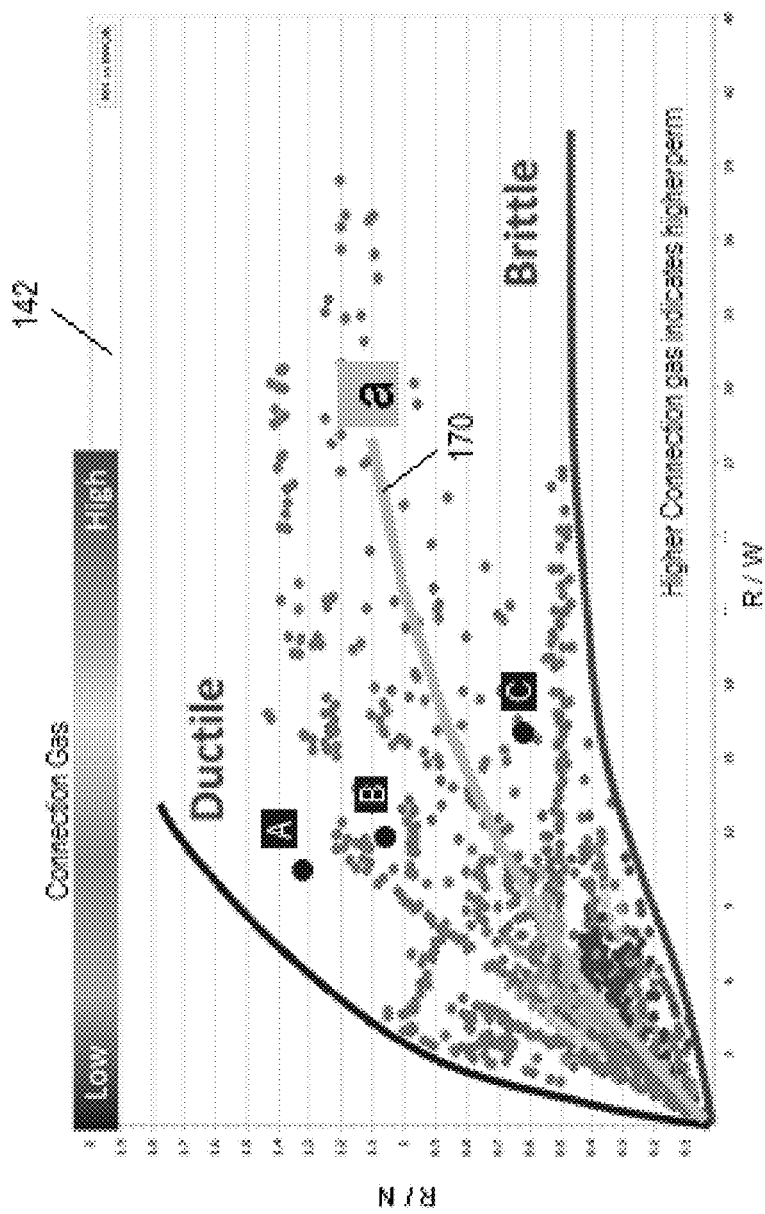
FIG. 17 depicts the cross plot of FIG. 11 and depicts aspects of calculation of an a-exponent and brittleness properties according to the method of FIG. 16.

In the third stage 163, a value or value range of the a-exponent is developed based on the drilling parameter chart. In one embodiment, the a-exponent is derived by performing a regression fit or other suitable mathematical or statistical operation to estimate a trend line for the data in the brittleness chart. For example, as shown in FIG. 17, the data points of the cross plot are fit to a curve 170. The curve 170 may be derived from all data points, or from a subset of data points corresponding to selected connection gas volumes.

As discussed above, the a-exponent controls the trend line or curve 170 shape. Because the cross plot of R/N vs. R/W is related to the interaction between a drill bit and drilled rock, the cross plot pattern is an indicator of rock type, mineralogy content and other environmental factors. So the a-exponent is an empirical exponent related to geological settings. The a-exponent could be calculated on a per-borehole basis, calculated for individual borehole sections, or calculated for a formation region including one or more boreholes. As the a-exponent depends on variations in geological settings, the a-exponent can be a regional parameter if only small variation in geological settings observed.

In the fourth stage 164, a brittleness log is calculated based on the a-exponent. As shown in FIG. 17, the position of a given data point in the chart is associated with different brittleness indicator value based on its position relative to the trend line. The curve 170 may divide the data points into two areas. For example, an area above the curve 170 is considered as a ductile area, and an area below the curve 170 is considered as a brittle area. The division need not be strict, but may be similar to the manner in which elastic properties are used to define brittleness.

For example, the points A, B and C shown in FIG. 17 will have different brittleness indicator values because they are in different positions along the borehole (or relative to the curve 170).

Figure 18:
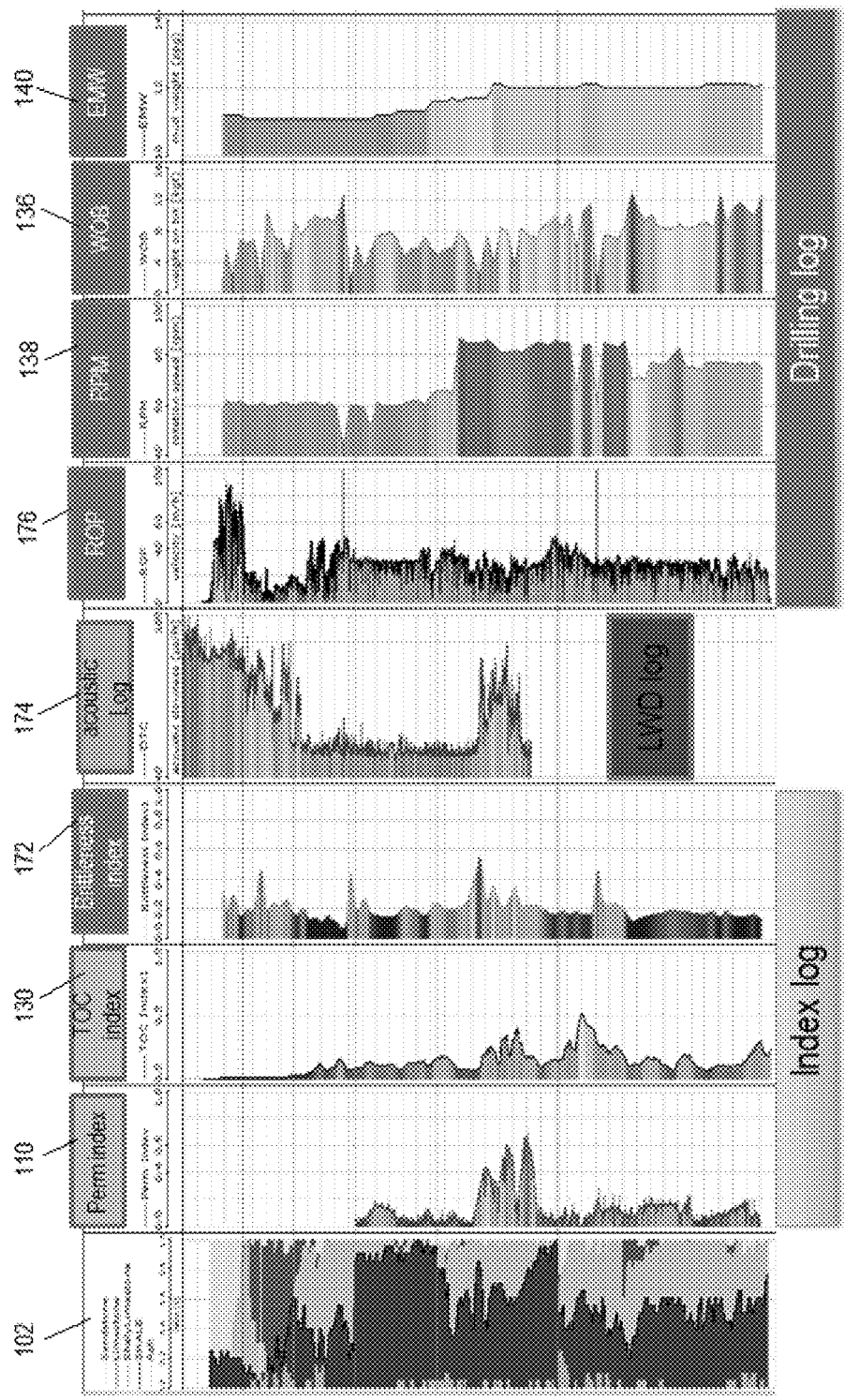
FIG. 18 depicts an example of a brittleness indicator log calculated using the method of FIG. 16.
Figure 19:
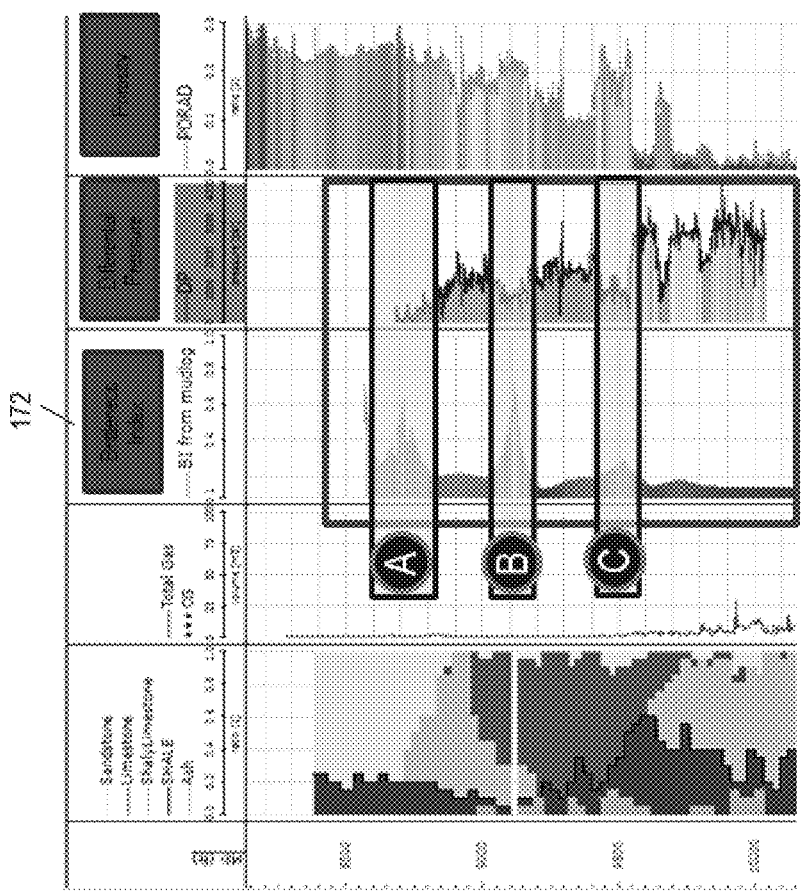
FIG. 19 illustrates correlations between brittleness and differential pressure.

The brittleness indicator may be incorporated into a brittleness log. For example, FIG. 18 shows an example of the logging data 100 including an index or indicator log, which may include the lithology log 102, the gas indictor log 110, the TOC indicator log 130 and a brittleness indicator log 172. The brittleness indicator can be calculated only using drilling parameter data as discussed above, or can be calculated in conjunction with additional data. For example, the brittleness indicator log 172 and/or other parts of the index log may be presented with additional data such as an acoustic log 174 and a drilling parameter log. In this example, the drilling parameter log includes the RPM log 138, the WOB log 136, the EMW log 140 and a ROP log 176. Interpretation of drilling data and calculation of the brittleness indicator can be strengthened when multiple parameters indicate the same change.

The brittleness indicator can be used to derive various characteristics of a formation. For example, brittleness is related to differential pressure, and thus the brittleness indicator can be used to estimate differential pressure.

Figure 20:
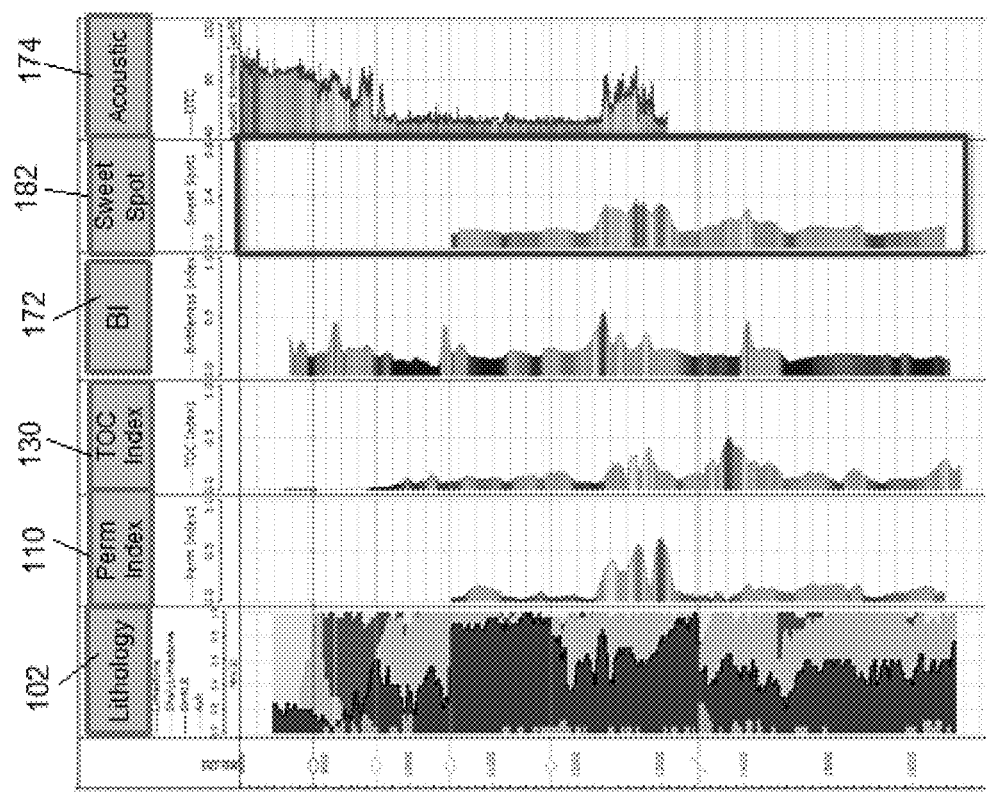
FIG. 20 depicts an example of a sweet spot indicator log.

Differential pressure is the difference between borehole fluid pressure and pore fluid pressure. The difference between the largest and smallest stress is called differential stress. FIG. 20 shows an example of differential pressure data 180 derived from a borehole and compared to the brittleness log 172. In this example, differential pressure was calculated from an LWD/wireline log, while brittleness was calculated based on drilling parameters as described herein. As shown, brittleness and differential pressure are related, with regions A, B and C show that borehole sections having low differential Pressure (DP) correspond to high brittleness.

Formation estimations derived according to the method 90, the method 120 and/or the method 160 may be used in a wide variety of applications. Such estimations may be used to refine fracturing and completion designs in individual wells, as a petrophysical property in a three-dimensional subsurface model, as secondary data to guide porosity/permeability/TOC population in a three-dimensional grid, and/or in pore pressure/effective stress analysis.

Figure 21:
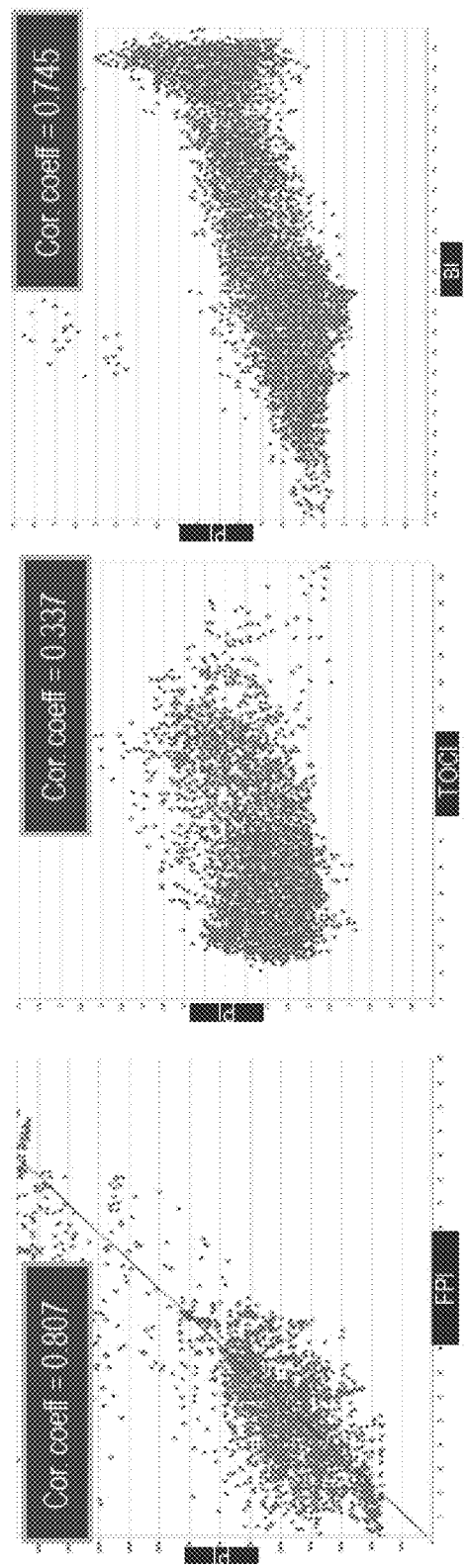
FIG. 21 depicts examples of correlation coefficients used to calculate the sweet spot indicator log of FIG. 20.

Referring to FIGS. 20 and 21, the processor is configured to generate or calculate a sweet spot indicator that is indicative of sweet spots, or regions of a formation that are more amenable to stimulation than other regions. The sweet spot indicator is calculated from mud log and/or drilling parameter data. In one embodiment, the sweet spot indicator is calculated based on formation information including information derived according to embodiments described herein.

The sweet spot indicator can be generated by a weighted combination of the gas indicator, TOC data and brittleness data. For example, a sweet spot indicator log 182 is calculated based on a weighted combination of the gas indicator log 110, the TOC indicator log 130 and the brittleness indicator log 172. The weighted combination is calculated using weighting factors assigned to each log. The weighting factors may be specific to an individual borehole, an individual section of a borehole, or for a formation region.

An example of the sweet spot calculation is described with reference to FIG. 21. In this example, gas indicator data (e.g., from the gas indicator log 110), TOC data and brittleness data are each assigned a weighting factor and the sweet spot indicator (SSI) is calculated according to the following equation:

$$SSI = w_1*FP + w_2*TOC + w_3*BI, \qquad (3)$$

where "FP" is a gas indicator value, "TOC" is a TOC value and "BI" is a brittleness value. "$w_1$" is a weighting factor assigned to gas indicator data, "$w_2$" is a weighting factor assigned to TOC data, and "$w_3$" is a weighting factor assigned to BI data.

Figure 22:
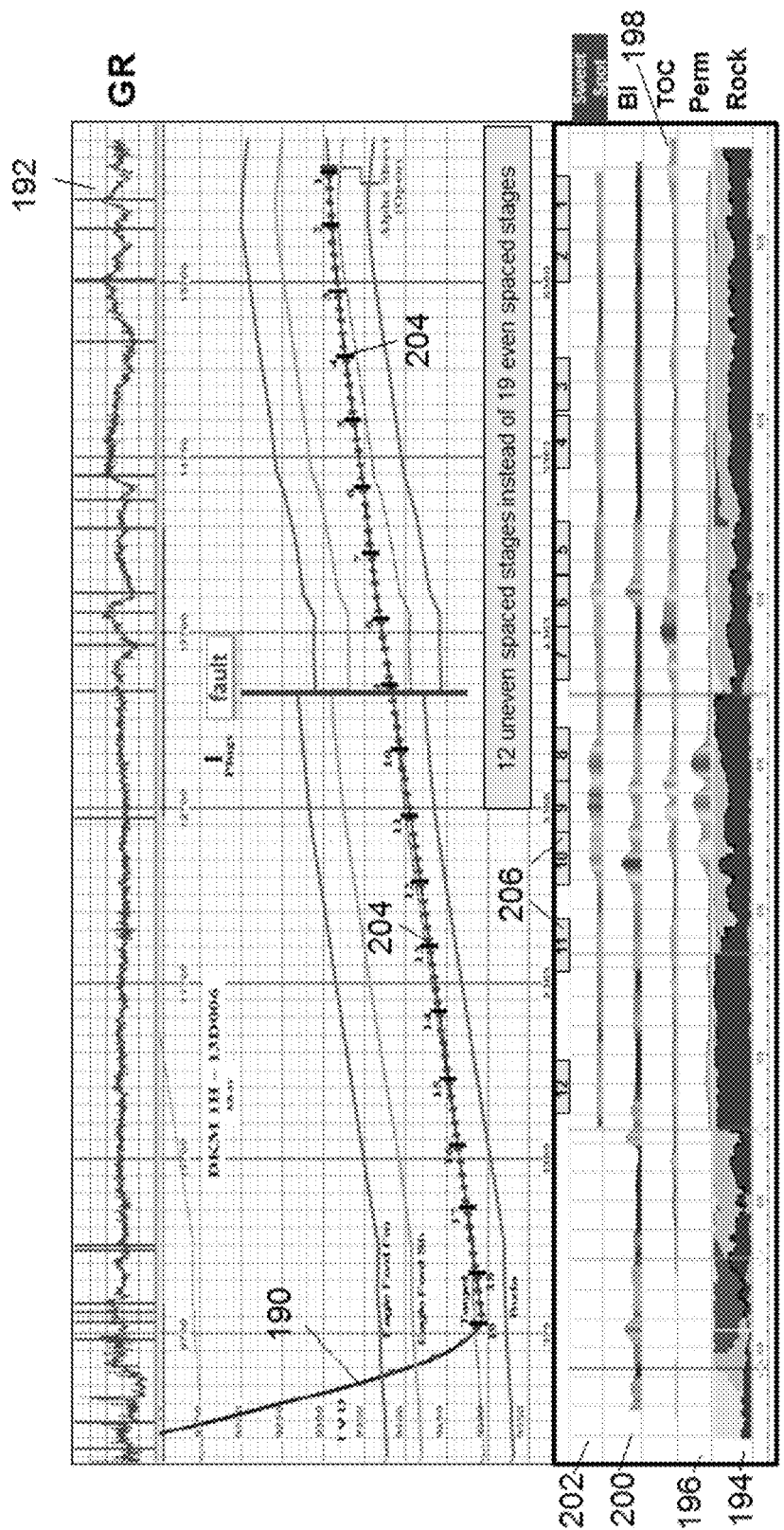
FIG. 22 depicts an example of an application of a sweet spot indicator log to a hydraulic fracturing system.

In one embodiment, the weighting factors are calculated based on a correlation with other measurement data, FIG. 22 shows an example of weighing factors based on correlation with production logging tool (PLT) data. In this example, each of the gas indicator (FP) data, the TOC data and the BI data is cross-correlated and analyzed by linear regression. The slope of the linear regression function corresponds to the weighting factor. It is noted that any correlation coefficient of correlation value using any suitable statistical analysis may be used, and is not limited to that described herein. In this example, the weighting factors are calculated as follows:

$$w_1 = \frac{0.807}{0.807 + 0.745 + 0.337} = 0.427;$$

$$w_2 = \frac{0.337}{0.807 + 0.745 + 0.337} = 0.178; \text{ and}$$

$$w_3 = \frac{0.745}{0.807 + 0.745 + 0.337} = 0.395.$$

Accordingly, the sweet spot indicator (SSI) may be calculated as a function of depth as follows:

$$SSI = 0.427 * FP + 0.178 * TOC + 0.395 * BI.$$

As discussed above, formation property data derived as described herein presents a number of advantages. For example, the formation measurements and indicators described herein have significant value in promoting knowledge about the heterogeneity of unconventional formations such as shale reservoirs and can facilitate fracture design, well placement and re-fracture candidate selection.

For example, currently most shale assets take the "factory drilling" approach using pre-determined drilling parameters and use geometric fracture patterns corresponding to evenly-spaced stages. FIG. 22 shows exemplary logging data for a borehole 190 having a horizontal section. Gamma ray (GR) log data 192 is displayed, along with lithology data 194, a gas indicator 196, a TOC log 198 and a brittleness log 200. A sweet spot indicator log 202 is shown which was calculated as described herein.

The horizontal section shows a series of evenly-spaced fracturing stages 204. As is evident by the sweet spot calculation, the effectiveness of fracturing can be significantly improved or optimized by positioning fracturing spaces in sweet spot regions 206 corresponding to sections of the sweet spot log having relatively high values. As the calculation shows, instead of nineteen evenly spaced stages that would normally be designed, a more effective fracturing operation can be achieved by fracturing at twelve unevenly spaced stages.

An embodiment of a method of estimating formation properties includes generating a lithology and/or facies model such as a lithology fraction model. In this method, mud log lithology data such as all or part of the lithology log 70 (or multiple lithology logs from one or multiple wells) is used as an input to populate lithology and/or facies in a subsurface model. In one embodiment, the mud log lithology data is used to generate a single facies and/or lithology log for input to the subsurface model.

The method includes a first stage, in which mud log lithology logs are input to a model or modeling program. In a second stage, lithology logs are upscaled to a three-dimensional grid. The upscaled logs are then normalized (e.g., so that lithology type fractions sum to one) at a third stage, and lithologies are populated using geostatic methods (at a fourth stage). At a fifth stage, the populated lithologies are normalized (e.g., to sum to one in each cell), and the lithology fraction model is generated.

Lithology and/or mineralogy data or logs generated from mud logs (alone or in combination with other logs such as the TOC indicator log) may be used for detailed assessment of reservoir and/or completion quality. In addition, lithology and/or mineralogy data can be used for quick assessments of reservoir and/or completion quality. For example, reservoir quality in shale is largely dependent on mineralogy, thus the lithology and/or mineralogy logs can be used to assess reservoir quality. In addition, lithology and/or mineralogy can be used to evaluate mechanical properties, as mechanical properties can be indicated by variations in mineralogy. Other uses of lithology and/or mineralogy data as described herein include condition distribution of other properties (e.g., porosity) and input for planning or designing completions and operations (e.g., planning stimulation planning, completion design and/or horizontal lateral placement).

Set forth below are some embodiments of the foregoing disclosure:

Embodiment 1: A method of estimating one or more properties of an earth formation, the method comprising: disposing a carrier in a borehole in an earth formation as part of an energy industry operation; receiving borehole fluid from the borehole, the borehole fluid including at least injection fluid injected into the borehole; estimating at least one property of the borehole fluid associated with one or more intervals along the borehole and generating a mud log that indicates values of the at least one property at the one or more intervals, the at least one property including at least one of gas content and cuttings content; estimating, by a processor, one or more properties of the formation based on the mud log, the one or more properties selected from at least one of lithology, permeability, total organic carbon and brittleness; and controlling one or more operational parameters of the energy industry operation based on the one or more properties of the formation.

Embodiment 2: The method of embodiment 1, wherein estimating the at least one property of the borehole fluid includes measuring an amount of one or more types of gases in the borehole fluid associated with one or more intervals, and generating a gas log indicating at least an amount of total gas.

Embodiment 3: The method of embodiment 2, wherein generating the gas log includes estimating an amount of connection gas by identifying a peak in the gas log at a location along the borehole, and comparing an amplitude of the peak to an amplitude of the gas log at one or more other locations along the borehole.

Embodiment 4: The method of embodiment 3, wherein estimating the one or more properties of the formation includes generating a gas indicator based on a difference between the amount of connection gas and the amount of total gas at one or more intervals, the gas indicator log indicating formation permeability.

Embodiment 5: The method of embodiment 2, wherein estimating the total organic carbon includes identifying a frequency of gas peaks in the gas log, the frequency corresponding to a number of gas peaks as a function of interval length.

Embodiment 6: The method of embodiment 5, wherein estimating the total organic carbon includes selecting a threshold frequency, separating the gas log into high frequency components and low frequency components, the high frequency components corresponding to the frequency of gas peaks being greater than or equal to the threshold frequency, and calculating a total organic carbon value based on an amount of total gas associated with the low frequency components.

Embodiment 7: The method of embodiment 1, wherein the energy industry operation is a drilling operation, the injection fluid includes drilling fluid, and the borehole fluid includes the drilling fluid and cuttings generated by the drilling operation.

Embodiment 8: The method of embodiment 7, wherein estimating the one or more properties of the formation includes analyzing the cuttings to determine relative amounts of rock types and mineral types, and generating a cuttings log indicating the relative amounts Embodiment 9: The method of embodiment 7, further comprising monitoring one or more drilling parameters, and generating a drilling log indicating the one or more drilling parameters.

Embodiment 10: The method of embodiment 9, wherein estimating the one or more properties of the formation includes calculating a brittleness indicator (BI) value based on the drilling parameters, the one or more drilling parameters including rate of penetration (R) and rotational rate (N), the brittleness indicator value based on the following equation:

$$R/N = BI(R/W)^a,$$

wherein "W" is a weight on bit, and "a" is an exponent corresponding to a trend line derived from a relationship between R and N.

Embodiment 11: The method of embodiment 1, further comprising identifying one or more intervals as sweet spots based on a combination of at least the total organic carbon and the brittleness.

Embodiment 12: A system for estimating one or more properties of an earth formation, the system comprising: a carrier configured to be disposed in a borehole in an earth formation as part of an energy industry operation; an analysis unit configured to receive borehole fluid from the borehole, the borehole fluid including at least injection fluid injected into the borehole, the analysis unit configured to estimate at least one property of the borehole fluid associated with one or more intervals along the borehole and generate a mud log that indicates values of the at least one property at the one or more intervals, the at least one property including at least one of gas content and cuttings content; and a processor configured to perform: estimating one or more properties of the formation based on the mud log, the one or more properties selected from at least one of lithology, permeability, total organic carbon and brittleness; and controlling one or more operational parameters of the energy industry operation based on the one or more properties of the formation.

Embodiment 13: The system of embodiment 12, wherein estimating the at least one property of the borehole fluid includes measuring an amount of one or more types of gases in the borehole fluid associated with one or more intervals, and generating a gas log indicating at least an amount of total gas.

Embodiment 14: The system of embodiment 13, wherein generating the gas log includes estimating an amount of connection gas by identifying a peak in the gas log at a location along the borehole, and comparing an amplitude of the peak to an amplitude of the gas log at one or more other locations along the borehole, and estimating the one or more properties of the formation includes generating a gas indicator based on a difference between the amount of connection gas and the amount of total gas at one or more intervals, the gas indicator log indicating formation permeability.

Embodiment 15: The system of embodiment 13, wherein estimating the total organic carbon includes identifying a frequency of gas peaks in the gas log, the frequency corresponding to a number of gas peaks as a function of interval length.

Embodiment 16: The system of embodiment 15, wherein estimating the total organic carbon includes selecting a threshold frequency, separating the gas log into high frequency components and low frequency components, the high frequency components corresponding to the frequency of gas peaks being greater than or equal to the threshold frequency, and calculating a total organic carbon value based on an amount of total gas associated with the low frequency components.

Embodiment 17: The system of embodiment 12, wherein the energy industry operation is a drilling operation, the injection fluid includes drilling fluid, and the borehole fluid includes the drilling fluid and cuttings generated by the drilling operation, and estimating the one or more properties of the formation includes analyzing the cuttings to determine relative amounts of rock types and mineral types, and generating a cuttings log indicating the relative amounts.

Embodiment 18: The system of embodiment 17, wherein the energy industry operation is a drilling operation, and the processor is configured to further perform monitoring one or more drilling parameters, and generating a drilling log indicating the one or more drilling parameters.

Embodiment 19: The system of embodiment 18, wherein estimating the one or more properties of the formation includes calculating a brittleness indicator (BI) value based on the drilling parameters, the one or more drilling parameters including rate of penetration (R) and rotational rate (N), the brittleness indicator value based on the following equation:

$$R/N = BI(R/W)^a,$$

wherein "W" is a weight on bit, and "a" is an exponent corresponding to a trend line derived from a relationship between R and N.

Embodiment 20: The system of embodiment 12, wherein the processor is configured to further perform identifying one or more intervals as sweet spots based on a combination of at least the total organic carbon and the brittleness.

Generally, some of the teachings herein are reduced to an algorithm that is stored on machine-readable media. The algorithm is implemented by a computer and provides operators with desired output.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. A method of estimating one or more properties of an earth formation, the method comprising:
disposing a carrier in a borehole in an earth formation as part of an energy industry operation;
receiving borehole fluid from the borehole, the borehole fluid including at least injection fluid injected into the borehole;
estimating at least one property of the borehole fluid associated with one or more intervals along the borehole and generating a mud log that indicates values of the at least one property at the one or more intervals, the at least one property including at least one of gas content and cuttings content;
estimating, by a processor, one or more properties of the formation based on the mud log, the one or more properties selected from at least one of lithology, permeability, total organic carbon and brittleness; and
controlling one or more operational parameters of the energy industry operation based on the one or more properties of the formation,
wherein the energy industry operation is a drilling operation, the injection fluid includes drilling fluid, the borehole fluid includes the drilling fluid and cuttings generated by the drilling operation, estimating the one or more properties of the formation includes analyzing the cuttings to determine relative amounts of rock types and mineral types, and generating a cuttings log indicating the relative amounts.

2. The method of claim 1, wherein estimating the at least one property of the borehole fluid includes measuring an amount of one or more types of gases in the borehole fluid associated with one or more intervals, and generating a gas log indicating at least an amount of total gas.

3. The method of claim 2, wherein generating the gas log includes estimating an amount of connection gas by identifying a peak in the gas log at a location along the borehole, and comparing an amplitude of the peak to an amplitude of the gas log at one or more other locations along the borehole.

4. The method of claim 3, wherein estimating the one or more properties of the formation includes generating a gas indicator based on a difference between the amount of connection gas and the amount of total gas at one or more intervals, the gas indicator log indicating formation permeability.

5. The method of claim 2, wherein estimating the total organic carbon includes identifying a frequency of gas peaks in the gas log, the frequency corresponding to a number of gas peaks as a function of interval length.

6. The method of claim 5, wherein estimating the total organic carbon includes selecting a threshold frequency, separating the gas log into high frequency components and low frequency components, the high frequency components corresponding to the frequency of gas peaks being greater than or equal to the threshold frequency, and calculating a total organic carbon value based on an amount of total gas associated with the low frequency components.

7. The method of claim 1, further comprising monitoring one or more drilling parameters, and generating a drilling log indicating the one or more drilling parameters.

8. The method of claim 7, wherein estimating the one or more properties of the formation includes calculating a brittleness indicator (BI) value based on the drilling parameters, the one or more drilling parameters including rate of penetration (R) and rotational rate (N), the brittleness indicator value based on the following equation:

$$R/N = BI(R/W)^a,$$

wherein "W" is a weight on bit, and "a" is an exponent corresponding to a trend line derived from a relationship between R and N.

9. The method of claim 1, further comprising identifying one or more intervals as sweet spots based on a combination of at least the total organic carbon and the brittleness.

10. A system for estimating one or more properties of an earth formation, the system comprising:
a carrier configured to be disposed in a borehole in an earth formation as part of an energy industry operation;
an analysis unit configured to receive borehole fluid from the borehole, the borehole fluid including at least injection fluid injected into the borehole, the analysis unit configured to estimate at least one property of the borehole fluid associated with one or more intervals along the borehole and generate a mud log that indicates values of the at least one property at the one or more intervals, the at least one property including at least one of gas content and cuttings content; and
a processor configured to perform:
estimating one or more properties of the formation based on the mud log, the one or more properties selected from at least one of lithology, permeability, total organic carbon and brittleness; and
controlling one or more operational parameters of the energy industry operation based on the one or more properties of the formation,
wherein the energy industry operation is a drilling operation, the injection fluid includes drilling fluid, and the borehole fluid includes the drilling fluid and cuttings generated by the drilling operation, estimating the one or more properties of the formation includes analyzing the cuttings to determine relative amounts of rock types and mineral types, and generating a cuttings log indicating the relative amounts.

11. The system of claim 10, wherein estimating the at least one property of the borehole fluid includes measuring an amount of one or more types of gases in the borehole fluid associated with one or more intervals, and generating a gas log indicating at least an amount of total gas.

12. The system of claim 11, wherein generating the gas log includes estimating an amount of connection gas by identifying a peak in the gas log at a location along the borehole, and comparing an amplitude of the peak to an amplitude of the gas log at one or more other locations along the borehole, and estimating the one or more properties of the formation includes generating a gas indicator based on a difference between the amount of connection gas and the amount of total gas at one or more intervals, the gas indicator log indicating formation permeability.

13. The system of claim 11, wherein estimating the total organic carbon includes identifying a frequency of gas peaks in the gas log, the frequency corresponding to a number of gas peaks as a function of interval length.

14. The system of claim 13, wherein estimating the total organic carbon includes selecting a threshold frequency, separating the gas log into high frequency components and low frequency components, the high frequency components corresponding to the frequency of gas peaks being greater than or equal to the threshold frequency, and calculating a total organic carbon value based on an amount of total gas associated with the low frequency components.

15. The system of claim 10, wherein the energy industry operation is a drilling operation, and the processor is configured to further perform monitoring one or more drilling parameters, and generating a drilling log indicating the one or more drilling parameters.

16. The system of claim 15, wherein estimating the one or more properties of the formation includes calculating a brittleness indicator (BI) value based on the drilling parameters, the one or more drilling parameters including rate of penetration (R) and rotational rate (N), the brittleness indicator value based on the following equation:

$$R/N = BI\ (R/W)^a,$$

wherein "W" is a weight on bit, and "a" is an exponent corresponding to a trend line derived from a relationship between R and N.

17. The system of claim 10, wherein the processor is configured to further perform identifying one or more intervals as sweet spots based on a combination of at least the total organic carbon and the brittleness.

* * * * *

UNITED STATES PATENT AND TRADEMARK OFFICE
CERTIFICATE OF CORRECTION

PATENT NO. : 10,370,964 B2
APPLICATION NO. : 15/068033
DATED : August 6, 2019
INVENTOR(S) : Wenxia Yang and Xiaomei Zhang It is certified that error appears in the above-identified patent and that said Letters Patent is hereby corrected as shown below:

In the Claims

Claim 1, Column 19, Line 9, delete "an earth formation" and insert therefor --the earth formation--.
Claim 1, Column 19, Lines 20 and 21, delete "one or more properties of the formation" and insert therefor --the one or more properties of the earth formation--.
Claim 1, Column 19, Line 26, delete "the formation" and insert therefor --the earth formation--.
Claim 1, Column 19, Line 31, delete "the formation" and insert therefor --the earth formation--.
Claim 2, Column 19, Line 38, delete "one or more intervals" and insert therefor --the one or more intervals--.
Claim 4, Column 19, Line 46, delete "the formation" and insert therefor --the earth formation--.
Claim 4, Column 19, Lines 48-49, delete "one or more intervals" and insert therefor --the one or more intervals--.
Claim 4, Column 19, Line 49, delete "indicating formation" and insert therefor --indicating earth formation--.
Claim 6, Column 19, Line 61, delete "an amount of total gas" and insert therefor --the amount of total gas--.
Claim 8, Column 19, Line 67, delete "the formation" and insert therefor --the earth formation--.
Claim 8, Column 20, Lines 1 and 2, delete "the drilling parameters" and insert therefor --the one or more drilling parameters--.
Claim 9, Column 20, Lines 11 and 12, delete "identifying one or more intervals" and insert therefor --identifying the one or more intervals--.
Claim 10, Column 20, Lines 16 and 17, delete "an earth formation" and insert therefor --the earth formation--.
Claim 10, Column 20, Line 28, delete "estimating one or more properties of the formation" and insert therefor --estimating the one or more properties of the earth formation--.
Claim 10, Column 20, Line 34, delete "the formation" and insert therefor --the earth formation--.
Claim 10, Column 20, Line 39, delete "the formation" and insert therefor --the earth formation--.
Claim 11, Column 20, Line 46, delete "with one or more intervals" and insert therefor --with the one or more intervals--.
Claim 12, Column 20, Line 54, delete "the formation" and insert therefor --the earth formation--.

Signed and Sealed this
Twenty-fourth Day of September, 2019

Andrei Iancu
*Director of the United States Patent and Trademark Office*

CERTIFICATE OF CORRECTION (continued)
U.S. Pat. No. 10,370,964 B2

Claim 12, Column 20, Line 56, delete "one or more intervals" and insert therefor --the one or more intervals--.
Claim 12, Column 20, Line 57, delete "indicating formation permeability" and insert therefor --indicating earth formation permeability--.
Claim 14, Column 21, Line 1, delete "an amount" and insert therefor --the amount--.
Claim 15, Column 21, Line 4, delete "a drilling operation" and insert therefor --the drilling operation--.
Claim 16, Column 21, Line 9, delete "the formation" and insert therefor --the earth formation--.
Claim 16, Column 21, Lines 10 and 11, delete "the drilling parameters" and insert therefor --the one or more drilling parameters--.